United States Patent
Mordo et al.

(10) Patent No.: US 12,038,827 B2
(45) Date of Patent: *Jul. 16, 2024

(54) SYSTEM AND METHOD OF HANDLING COMPLEX EXPERIMENTS IN A DISTRIBUTED SYSTEM

(71) Applicant: Wix.com Ltd., Tel Aviv (IL)

(72) Inventors: Aviran Mordo, Petach Tikva (IL); Talya Gendler, Tel Aviv (IL); Sagy Rozman, Tel Aviv (IL); David Schwartz, Kiryat Ono (IL); Ronen Ben-David, Rehovot (IL); Omry Nachman, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 24 days.

This patent is subject to a terminal disclaimer.

(21) Appl. No.: 17/463,583

(22) Filed: Sep. 1, 2021

(65) Prior Publication Data

US 2021/0397541 A1 Dec. 23, 2021

Related U.S. Application Data

(63) Continuation of application No. 16/903,448, filed on Jun. 17, 2020, now Pat. No. 11,119,897, which is a (Continued)

(51) Int. Cl.
*G06F 9/44* (2018.01)
*G06F 8/34* (2018.01)
*G06F 11/36* (2006.01)

(52) U.S. Cl.
CPC ............ *G06F 11/3664* (2013.01); *G06F 8/34* (2013.01); *G06F 11/3692* (2013.01)

(58) Field of Classification Search
CPC ...... G06F 8/34; G06F 11/3664; G06F 11/3692
(Continued)

(56) References Cited

U.S. PATENT DOCUMENTS 7,308,497 B2 12/2007 Louviere
8,327,271 B2 12/2012 Miller
(Continued)

OTHER PUBLICATIONS

Benjamin S. Lerner, "Designing for Extensibility and Planning for Conflict: Experiments in Web-Browser Design", 2011, University of Washington, Thesis, 248 pages. (Year: 2011).*

(Continued)

*Primary Examiner* — Ted T. Vo
(74) *Attorney, Agent, or Firm* — HEIDI BRUN ASSOCIATES LTD.

(57) ABSTRACT

A system to detect and resolve conflicts between different experiments running on a website building system (WBS). The system includes at least one processor, a conflict resolver to check for interactions and conflicts between an experiment and at least one other existing experiment from a set of existing experiments in the WBS, when the experiment is set-up or integrated into the set of existing experiments. The conflict resolver either resolves the interactions and conflicts, or allows the interactions and conflicts to remain. The system also includes an experiment manager running on the at least one processor to manage and coordinate the experiment and the at least one other existing experiment when the experiment is running concurrently with the at least one other existing experiment, after set-up or integration of the experiment.

28 Claims, 5 Drawing Sheets

Related U.S. Application Data continuation of application No. 14/926,007, filed on Oct. 29, 2015, now Pat. No. 10,733,078.

(60) Provisional application No. 62/072,460, filed on Oct. 30, 2014.

(58) Field of Classification Search
USPC .......................................................... 717/124
See application file for complete search history.

(56) References Cited

U.S. PATENT DOCUMENTS

| | | | |
|---|---|---|---|
| 8,682,712 | B2 | 3/2014 | Khopkar |
| 8,799,188 | B2 | 8/2014 | White |
| 10,185,703 | B2 | 1/2019 | Abrahami |
| 10,509,850 | B2 | 12/2019 | Abrahami |
| 10,733,078 | B2 | 8/2020 | Mordo |
| 11,119,897 | B2 | 9/2021 | Mordo |
| 2002/0147799 | A1 | 10/2002 | Alhalabi |
| 2013/0219263 | A1 | 8/2013 | Abrahami |
| 2014/0067556 | A1 | 3/2014 | Burt |
| 2014/0229821 | A1 | 8/2014 | Abrahami |

OTHER PUBLICATIONS

Kohavi et al., "Online Experimentation at Microsoft", 2009, ACM, pp. 11-22. (Year: 2009).*

Siddarth Deswal, "A Web Designer's Introduction to A/B Testing", 2012, retrieved from https://webdesign.tutsplus.com/articles/a-web-designers-introduction-to-ab-testing-webdesign-9056, 12 pages (Year: 2012).

Lauren Owens, "How to Conduct A/B Testing Using Google Analytics", Oct. 22, 2014, retrieved from http://www.morevisibility.com/blogs/analytics/how-to-conduct-ab-test-using-google-analytics.html, 5 pages.

Google Analytics, "Run an Experiment", 2013, retrieved from https:/support.google.com/analytics/topics/1745208 via http://web.archive.org/, 35 pages.

James et al., "User-friendly scheduling tools for large-scale simulation experiments", 2007, IEEE, pp. 610-616.

Marcell et al., "Online Data Collection with Special Populations over the World Wide Web", 2001, College of Charleston, South Carolina, pp. 106-123.

Reips et al., "WEXTOR: A Web-based tool for Generating and Visualizing Experimental Designs and Procedures", 2002, Psychonomic Society, Inc., pp. 234-240.

Scott Shannon, "Customer Insights with Google Analytics Demographics", Mar. 2014, Online Behavior, 8 pages.

Yastrebenetsky, "Introduction to Google Analytics Sampling", Jun. 2012, InfoTrust, 7 pages.

Alex Liu, "JavaScript and the Netflix User Interface—Conditional dependency resolution", Sep. 2014, ACMQueue, Parallel Programming, vol. 12, No. 9, pp. 1-13 (Year: 2014).

Jakob Jenkov, "Understanding Dependencies", 2012, downloaded from https://web.archive.org/web/20120415122644/ http://tutorials.jenkov.com/, 6 pages. (Year: 2012).

Kohavi et al., "Online Experiments: Practical Lessons", 2010, IEEE Computer Society, pp. 82-85.

\* cited by examiner

SYSTEM AND METHOD OF HANDLING COMPLEX EXPERIMENTS IN A DISTRIBUTED SYSTEM

CROSS-REFERENCE TO RELATED APPLICATIONS

This application is a continuation of U.S. application Ser. No. 16/903,448, filed Jun. 17, 2020, which is a continuation of U.S. application Ser. No. 14/926,007, filed Oct. 29, 2015, which claims benefit from U.S. Provisional Patent Application No. 62/072,460 filed Oct. 30, 2014, all of which are hereby incorporated in their entirety by reference.

FIELD OF THE INVENTION

The present invention relates to website building systems generally and to handling experiments in particular.

BACKGROUND OF THE INVENTION

Website development systems are designed for developers, third party application developers and end users to design, develop and market their own tailored websites. There is a constant need to update the website system in question and often it may be necessary to determine whether changes are feasible before they are implemented.

Some changes may be specific to particular geographic populations (such as all users located in a particular country), technology specific (all iPad users) or may be specific to a particular system feature etc. Such changes often start from a hypothesis that the change (or new feature) would have a positive effect on a key performance indicator—the success metric. Thus it is often desirable to release the updated feature to the pertinent population, without their knowledge and to follow up and monitor its use based on pre-defined success metrics. The results of such experimental release would determine whether the change (or new feature) is successful as hypothesized or not.

Experiment management systems are known in the art and provide the opportunity to accelerate innovation by evaluating ideas quickly and accurately usually using controlled experiments such as A/B and multivariate tests with the underlying system. In these tests, a change is usually measured against a baseline version of the system.

SUMMARY OF THE PRESENT INVENTION

There is provided, in accordance with a preferred embodiment of the present invention, a system to detect and resolve conflicts between different experiments running on a website building system (WBS). The system includes at least one processor, a conflict resolver, and an experiment manager running on the at least one processor. The conflict resolver checks for interactions and conflicts between an experiment and at least one other existing experiment from a set of existing experiments in the WBS, when the experiment is set-up or integrated into the set of existing experiments. The conflict resolver either resolves the interactions and conflicts, or allows the interactions and conflicts to remain. The experiment manager manages and coordinates the experiment and the at least one other existing experiment when the experiment is running concurrently with the at least one other existing experiment, after set-up or integration of the experiment into the set of existing experiments by the conflict resolver.

Moreover, in accordance with a preferred embodiment of the present invention, the conflict resolver checks for interactions and conflicts within a definition and a specification of the experiment or a definition and specification of the at least one other experiment.

Additionally, in accordance with a preferred embodiment of the present invention, the interactions and conflicts are dependency, ambiguity, consistency, or collisions between the experiment and the at least one other experiment.

Alternatively, in accordance with a preferred embodiment of the present invention the experiment is running concurrently with the at least one other existing experiment for at least one particular user.

Further, in accordance with a preferred embodiment of the present invention, the conflict resolver indicates if interactions and conflicts remain by marking conflicting experiments in a database or warning a website designer.

Still further, in accordance with a preferred embodiment of the present invention, the conflict resolver resolves interactions and conflicts using a technique which is fully automatic, partially automatic or user interactive.

Moreover, in accordance with a preferred embodiment of the present invention, the conflict resolver resolves interactions and conflicts by not integrating the experiment, creating at least one new experiment, changing experiment definition, changing experiment priority, changing experiment source code, changing experiment order, changing user assignment, changing experiment dependency, creating multiple method files, or separating experiments.

Additionally, in accordance with a preferred embodiment of the present invention, the conflict resolver indicates when new interactions and conflicts are created as a result of a resolution.

Alternatively, in accordance with a preferred embodiment of the present invention, the experiment manager manages and coordinates using fully automatic techniques according to a defined set of rules.

Further, in accordance with a preferred embodiment of the present invention, the experiment manager includes an active conflict resolver to perform changing experiment priority, not selecting experiment, changing experiment order, changing user assignment, changing experiment dependency, selecting a different experiment, or separating experiments.

Still further, in accordance with a preferred embodiment of the present invention, the experiment manager performs selecting a different experiment according to an experiment priority.

Moreover, in accordance with a preferred embodiment of the present invention, the experiment manager performs separating experiments, by assigning experiments to different user populations.

Additionally, in accordance with a preferred embodiment of the present invention, the experiment manager maintains details of interactions and conflicts for each open experiment, and updates the details whenever the open experiments change.

There is provided, in accordance with a preferred embodiment of the present invention a method to detect and resolve conflicts between different experiments running on a website building system (WBS). The method includes checking for interactions and conflicts between an experiment and at least one other experiment from a set of experiments in the WBS, and either resolving the interactions and conflicts, or allowing the interactions and conflicts to remain when the experiment is set-up or integrated into the set of experiments. The method also includes managing and coordinating the experiment and the at least one other existing experiment when the experiment is running concurrently with the at least one other existing experiment, after set-up or integration of the experiment into the set of existing experiments.

Moreover, in accordance with a preferred embodiment of the present invention, the checking is performed within a definition and a specification of the experiment or a definition and specification of the at least one other experiment.

Additionally, in accordance with a preferred embodiment of the present invention, the interactions and conflicts are dependency, ambiguity, consistency, state maps, or collisions between the experiment and the at least one other experiment.

Alternatively, in accordance with a preferred embodiment of the present invention, the experiment is running concurrently with the at least one other existing experiment for at least one particular user.

Further, in accordance with a preferred embodiment of the present invention, the method includes, indicating if the interactions and conflicts remain by marking the experiment in a database or warning a website designer.

Still further, in accordance with a preferred embodiment of the present invention, the resolving includes operating using a modality which is fully automatic, partially automatic or via user interactive techniques.

Moreover, in accordance with a preferred embodiment of the present invention, the resolving includes not integrating the experiment, creating at least one new experiment, changing experiment definition, changing experiment priority, not selecting experiment, changing experiment order, changing user assignment, changing experiment dependency, selecting a different experiment, or separating experiments.

Additionally, in accordance with a preferred embodiment of the present invention, the method includes indicating if new interactions and conflicts are created as a result of resolving.

Alternatively, in accordance with a preferred embodiment of the present invention, the managing and coordinating includes operating automatically according to a defined set of rules.

Further, in accordance with a preferred embodiment of the present invention, the managing and coordinating includes changing experiment priority, not selecting experiment, changing experiment order, changing user assignment, changing experiment dependency, selecting a different experiment, or separating experiments.

Still further, in accordance with a preferred embodiment of the present invention, the selecting is according to the experiment priority.

Moreover, in accordance with a preferred embodiment of the present invention, the separating includes assigning the experiments to different user populations.

Additionally, in accordance with a preferred embodiment of the present invention, the method includes maintaining details of the interactions and conflicts for each open experiment and updating the details whenever the open experiments change.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
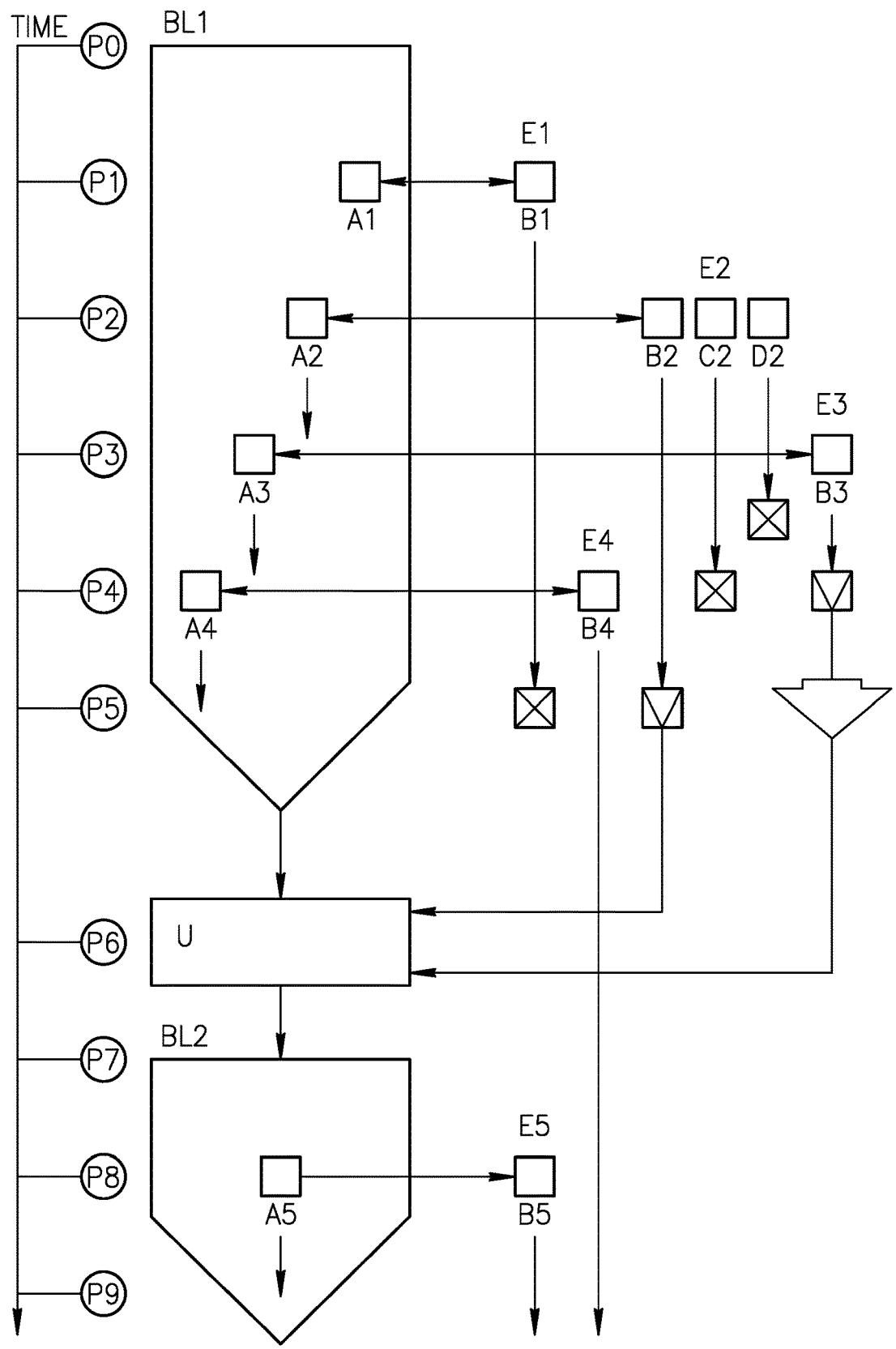
FIG. 1 is a schematic illustration of experiments, baselines and baseline updates.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that an experiment management system is desirable for managing multiple experiments inside a component based interactive system such as a website building system. Applicants have further realized that the systems of the prior art are limited in the type of tests they can support and cannot handle changes which may affect both code and web pages or a combination of the two.

Other types of experiments may include (but are not limited to) feature toggles, system updates and marketing campaigns. These experiment types are discussed in more detail herein below.

Applicants have also realized, for website building systems in particular, the experiment management system should be able to test sites developed by designers using the website building system including parts which may be developed by the particular website building system itself. The experiment management system should also support multi tenancy in order to provide experiment management services to the website building system vendor as well as regular designers using the system. The system should also be able to support developer and user supplied requests for how an experiment should be run and the variants used. For example it should allow a user to request to participate in a particular experiment rather than having the user randomly selected and assigned to a particular experiment.

Applicants have also realized that as well as coordinating and managing the different experiments, it is also desirable to detect and resolve conflicts between different experiments that are running concurrently as well as have the ability to update the parameters of the experiments and baselines according to an analysis of the results.

It will be appreciated that a typical website building system consists of inter-related software components. Components may be assumed to be elements of interpreted or compile-on-demand code, elements of already-compiled code (e.g. object modules or bytecode-compiled). Such elements may have been fully or partially linked. Components may also be data objects using some form of representation (e.g. JSON, XML etc.) used by other components or may be components which have been designed using the website building system. These could be represented through (procedural) code segments, data or a combination thereof. They could have a complex, non-linear structure due to the website building system using hierarchical or template-based data structures.

It will be further appreciated that there may be multiple developers which continuously modify the existing components, replace existing components or create new components—so as to support both system maintenance and system improvement. The components may interconnect using well-defined interfaces.

A typical website building system may have a set of components which form the baseline configuration for the pertinent system. In addition, the system may have multiple variant components which may or may not be activated. These variant components may be additional components or modified versions of existing components.

It will be appreciated that the activation of these variant components is done according to experiments, and a typical system may have multiple concurrent experiments. An experiment can typically be a binary experiment (e.g. select which of the two versions to use, or determine if an optional component is activated or not) or a multivariate experiment (selection among more than two possible versions). The process of determining which version to use (e.g. for a given user, site, etc.) is known as variant selection.

The component-experiment relationship may be n:m, i.e. a single experiment setting may control the inclusion (or variant selection) of multiple components, and a single component may be included in multiple experiments.

An experiment may affect both client and server subsystems. The experiment may have a direct visual effect on the user interaction (e.g. showing two different versions of some user interface (UI) elements or using different flow of control between UI elements), or may be hidden (e.g. running one of multiple internal algorithms).

As discussed herein above, desired experiments may include A/B tests and multivariate testing, feature toggles, system updates and marketing campaigns.

A/B test experiments are used to test the effect of a system modification on specific system metrics (such as session length, conversion to paid users etc.). A specific part of the user population is directed to use the modified version of the system (the B-variant) instead of the existing system (the A-variant). The test may include more than 2 options (known as Bx-variants, e.g. the B3-variant), and is then called a Multivariate Test (MVT).

Feature toggles consist of optional system elements that may be activated according to a parameter. Such a parameter may be a Boolean value (i.e. element can be turned on or off), may be one of multiple specific values, or may even be an arbitrary (open) value affecting the behavior of a system (e.g. an URL parameter specifying content for display, a database state specification etc.). The activation determination can be system-wide (e.g. affect all users) or user-community specific (e.g. affect a specific subset of users).

System update experiments may also implement a software update and system change, and are used in order to expose the change to a limited population of users, and to minimize the danger if the update turns out to have bugs or other problems.

It will be appreciated that the differences between the experiment types are not in their structure or definition, but are mostly related to the conditions under which they are activated.

Feature toggles may be already-tested system changes which the developers want in the system, but also want to be optionally activated—either centrally (for the entire user base) or based on a specific setting or user attributes (e.g. user type, geography, etc.).

A/B test experiments (and multivariate tests) are system changes whose inclusion is being considered by the system developers but is not certain (even if they are technically "correct" and contain no bugs). Thus, they are enabled for a certain percentage of certain user communities (through variant selection), with resulting business intelligence (BI) and metrics gathered so as to evaluate the change and reach a decision regarding its inclusion.

System updates are system changes which are intended to be rolled out for all users, but are tested gradually on population sub-sets of increasing size so as to provide for a phased roll-out. Once fully tested, the system update will be used by all users.

Other types of experiments may include marketing campaigns, which are essentially A/B test experiments and multivariate tests which may be tied to an external reference based on banner ad, social network ad etc. They may also include a specialized alternative landing page which is used as an entry point to the system or may be very long running. Whereas regular and multivariate tests may be typically closed (accepted/rejected) as early as possible, a successful marketing campaign may run as a separate experiment for a very long period of time.

It will be appreciated, that all experiments may be run against a baseline in order to determine the success or failure of each experiment.

It will be further appreciated that the baseline system against which the various experiments are compared may change over time. In particular, a typical system has a single deployed baseline version at any given time. However, the development team may create a new baseline merging multiple (successful) experiments once in a while, and this new baseline replaces the current (general availability) baseline—an event known as a baseline update.

Such a baseline update may occur one or more times during the experiment period—for example, a 2 month experiment in which the A-variant was A1 (in the 1st month) and then A2 (in the 2nd month).

Reference is now made to FIG. 1 which illustrates the implementation of multiple experiments together with baselines and baseline updates. The passage of time is represented by the line going from top to bottom of the figure with P0 . . . P9 being consecutive points in time.

As is illustrated, At P0, the system is deployed using the baseline BL1.

At P1, the A/B test E1 is opened, offering B1 as an alternative to A1. E1 starts running for a given population selection.

At P2, the Multivariate test E2 is opened, offering B2, C2 and D2 as alternatives to A2. E2 starts running for a given set of population selections. Variant D2 quickly proves to be problematic, and is stopped (e.g. the experiment manager sets its probability to 0). Later, variant C2 is seen to be unsuccessful and is also stopped. At this point, only alternatives A2 (the A-variant) and B2 remain active. At P5, there is sufficient collected data to prove that B2 is better than A2.

At P3, the A/B test E3 is opened, offering B3 as an alternative to A3. E3 starts running for a given population selection. B3 is quickly proved to be very successful, and is immediately expanded to apply to a much larger population (possibly to the entire set of users).

At P4, the ABT E4 is opened, offering B4 as an alternative to A4. E4 starts running for a given population selection.

At P5, there is sufficient collected data to determine that:
E1 has failed (i.e. variant B1 is worse than variant A1).
For multivariate test E2, variant B2 is more successful than the original variant A2. Note that the failing variants C2 and D2 have been stopped before.

It may also be determined that test B3 is (very) successful. However, there is not sufficient information collected about the recent E4 at this stage.

At P6 merging process U is performed, discarding E1 and merging B2 (from E2) and B3 (from E3) into the baseline BL1, creating the new baseline BL2.

At P7, a baseline update is performed, restarting the system with the new baseline BL2. It should be noted that experiment E4 continues running (comparing B4 to A4) after the baseline update, since there is not enough sufficient data at P5-P7 to know which variant to use in E4.

At P8, the A/B test E5 is opened, offering B5 as an alternative to A5. E5 starts running for a given population selection.

Thus, at P9—the new baseline BL2 is running, with the active experiments E4 and E5.

It will be appreciated that A/B and multivariate tests may differ substantially from feature toggle tests. For example A/B tests may report each variant selection to the system BI collection module (as described in more detail herein below). Feature toggle experiments typically do not report variant selection, though may do so in some cases, and may also report other information related to or based on the variant selection.

A/B tests may support user experience consistency where the same variant selection is used whenever the user re-enters the system (and until the experiment is terminated). This can be achieved through a number of mechanisms as discussed in more detail herein below. With feature toggle tests, it is acceptable (and typical) for a user to use a given feature toggle setting at one point in time and another one at a different point in time.

A/B tests may be paused (e.g. in addition to being on or off), but feature toggle tests may not. A/B tests may be paused by the experiment manager, but existing users for which a variant selection has already been performed would continue using their selected variant (A or B) and new users for which a selection was not yet performed would use the default variant (the regular "A" variant). These new users may be referred to as unselected users (i.e. not marked as "variant selection performed for this user").

When (and if) the experiment is resumed the unselected users may go through the variant selection process (whenever they re-enter the system) as though they were new users. This may change the user experience of an unselected user who had previously been using the A-variant and may now start using the B-variant. Unselected users (during pause or otherwise) do not generate any BI for the specific experiments (for which they are unselected) and thus no data is collected about them for the specific experiments.

It will be appreciated that an experiment which is on (also known as open) is still not necessarily active for any user. In order for an A/B test X to be actually active for the user (i.e. for its B-variant to be activated), all of the following conditions must be met:
The experiment X is on.
A population selection criteria (PSC) has been defined for X, e.g. "open X for 5% of the users in Europe").
The user must be a selected user, i.e. one for which the PSC has been evaluated.
The user must actually satisfy the PSC (e.g. in the example PSC above, both be in Europe and in the selected 5%).
The system has performed a secondary conflict check (as described below) and it did not result in canceling the experiment X for the given user, e.g. due to conflict with another (higher priority) experiment for the same user.
The user is an actual interactive user, and not a site-scanning bot or an indexing spider—since spiders do not provide actual user feedback, and so search engines would not index experimental features. There could be specific exceptions to this rule for experiments marked as applicable to spiders using a "spider access flag" in the experiment header as described below.

The handling of feature toggle experiments may be similar, except for the lack of "random" user selection (the 5% selection above). Thus the possible statuses for an experiment at the system level include:
Off—not active (i.e. not yet active or deactivated);
On—active for selection for unselected users; will be run for selected users which conform to the defined PSC; and
Paused (A/B tests only)—not active for selection but will run for previously selected users which got any non-A variant (B-variant for A/B tests, Bx-variant for multivariate tests).

The possible statuses for a user with respect to an experiment may be unselected—the user did not go through the selection process and selected—the user did go through the selection process and a specific variant (A, B or Bx) was selected.

Figure 2:
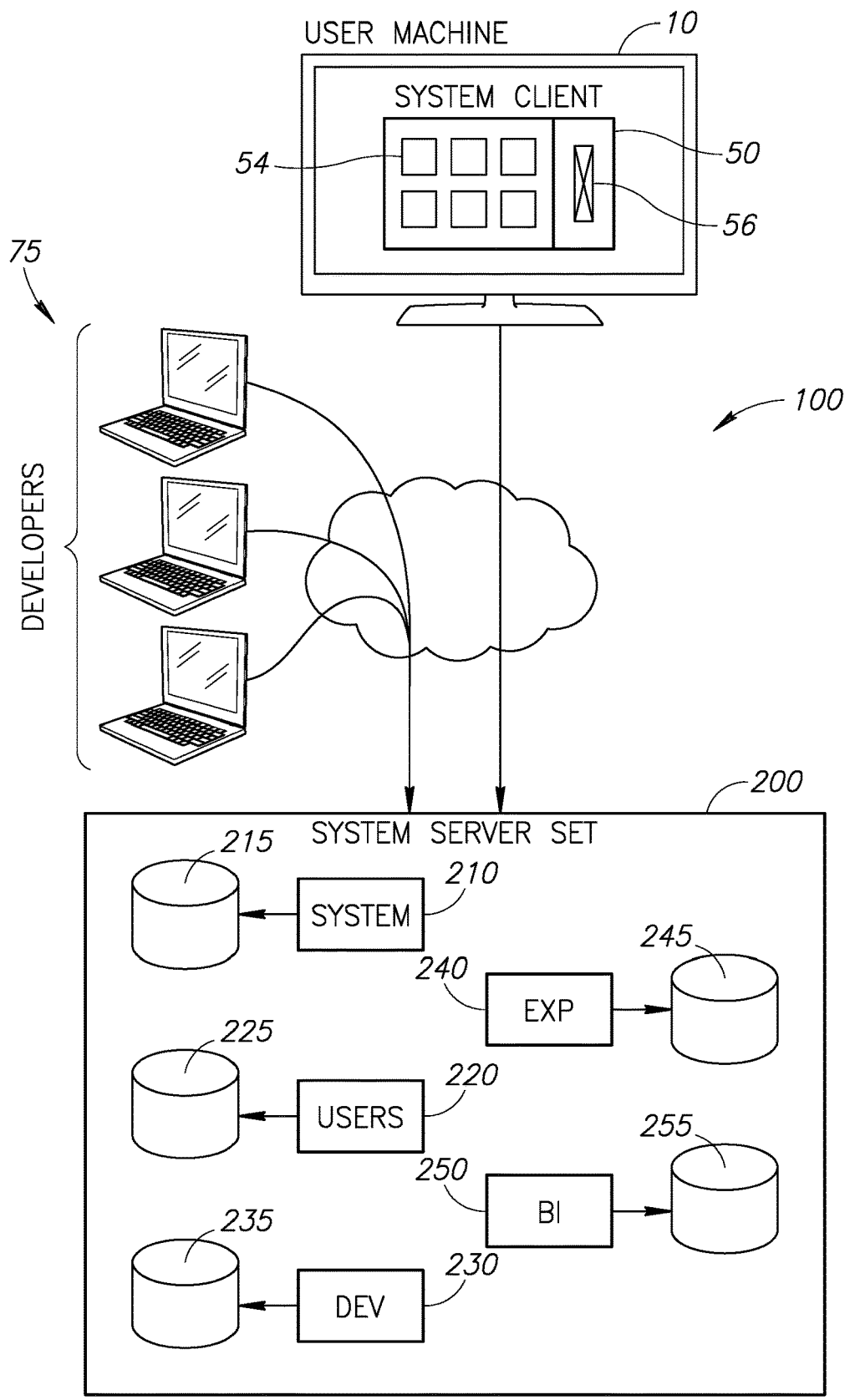
FIG. 2 is a schematic illustration of a system for combined experiment handling; constructed and operative in accordance with the present invention.

Reference is now made to FIG. 2 which illustrates a system 100 for combined experiment handling according to an embodiment of the present invention.

System 100 may comprise a client 50 and an underlying host server set 200 which may communicate through any communication medium such as the internet. Client 50 may be installed on a user machine 10 such as a mobile communication device, a tablet, a personal computer etc. and may further comprise a set of components 54 and possibly an experiment implementation module 56 as described in more detail herein below.

It will also be appreciated that system 100 may be used in conjunction with other types of on-line application editing and generation systems (and not just other website building system systems). These may include visual design systems for mobile (smartphones and tablets), desktop and client-side applications (although such systems should be on-line, or otherwise connected to experiment server 240 so as to be able to exchange component and experiment information). System 100 may also be embedded in actual on-line end-user applications (rather than application design systems).

Underlying host server set 200 may further comprise a systems server 210 hosting the server components for server set 200 on database 215, a user server 220, which handles user database 225 including the per-user profile for registered users, a development server 230 which contains the source code and other resources used by system developers 75 hosted on database 235 (including system elements under development), an experiment server 240 which provides experiment repository setup, management and use (as described in more detail herein below) and which saves experiments on database 245 and a BI server 250 which collects gathered experiment results and other business intelligence records and stores them on database 255 for reporting and analysis.

It will be appreciated that system 100 may be a client-server system used by multiple users through a communication network. Such a system could be a website building and hosting system, an ordering system, a content management system, a large-scale web site or any other system. System 100 may also include one or more server sub-systems and one or more client sub-systems.

It will be further appreciated that each of the sub-systems (server or client) could be, for example, a standalone (e.g. native) system, a virtual machine based system, a hosted application system (running on top of web server or browser) or based on any underlying framework.

System 100 may provide client code to the accessing client machines 50—either by loading the client code whenever accessing system 100 (as is in the case of a web site), or by updating (upon access or off-line) the client system code stored on client 50.

Figure 3:
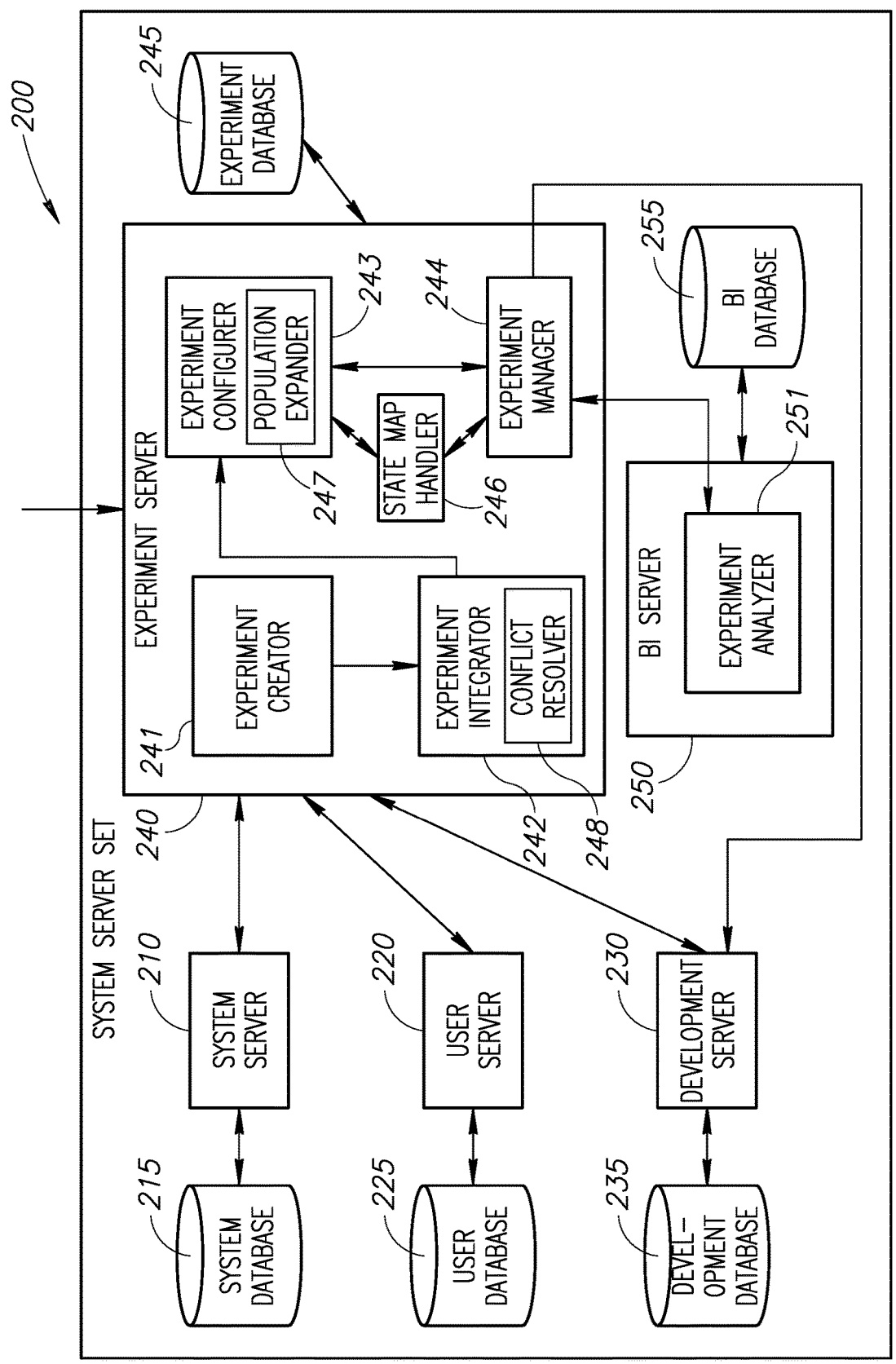
FIG. 3 is a schematic illustration of the elements of the system of FIG. 2, constructed and operative in accordance with the present invention.

Reference is now made to FIG. 3 which illustrates the elements and sub-elements of underlying server set 200. As is illustrated, experiment server 240 may further comprise an experiment creator 241, an experiment integrator 242, an experiment configurer 243, an experiment manager 244 and a state map handler 246. Experiment integrator 242 may also comprise a conflict resolver 248. Experiment configurer 243 may comprise a population expander 247. BI server 250 may further comprise an experiment analyzer 251. The functionality of these elements is discussed in more detail herein below.

Figure 4:
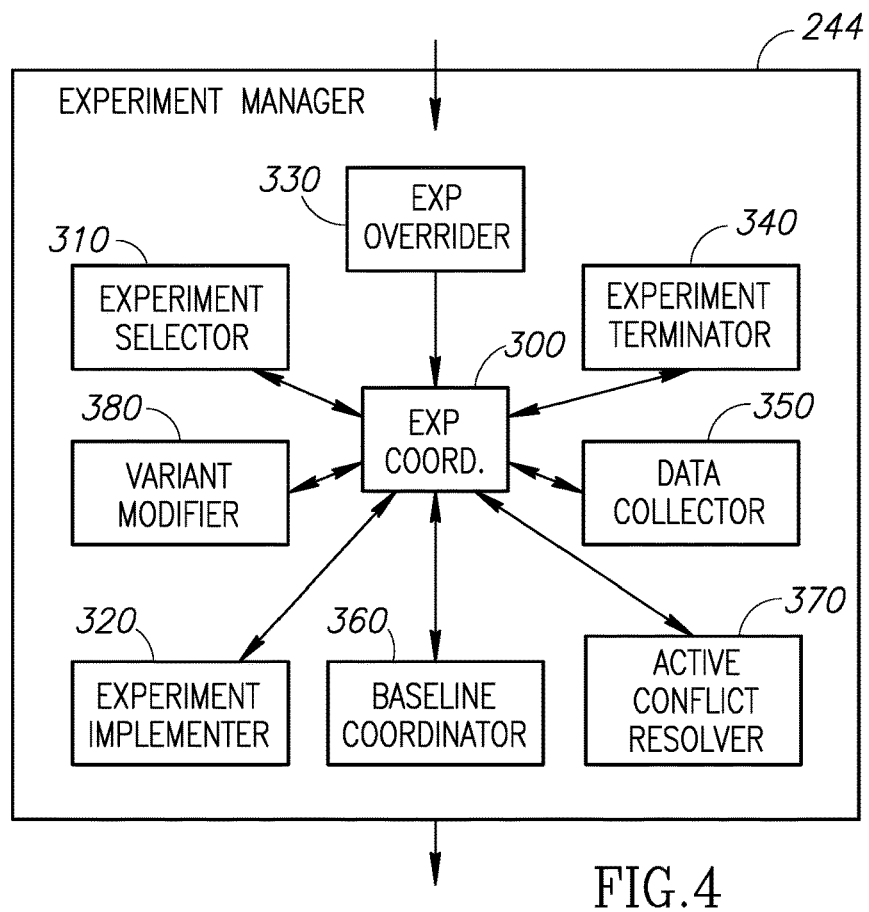
FIG. 4 is a schematic illustration of the elements of the experiment manager of FIG. 3, constructed and operative in accordance with the present invention.

Reference is now made to FIG. 4 which illustrates the elements of experiment manager 244. Experiment manager 244 may further comprise an experiment coordinator 300, an experiment selector 310, an experiment implementer 320, an experiment overrider 330, an experiment terminator 340, a data collector 350, a baseline coordinator 360, an active conflict resolver 370 and a variant modifier 380. The functionality of these elements is discussed in more detail herein below.

It will be appreciated that experiment server 240 may provide any experiment-related functions. These functions may be implemented on a single server or a set of connected servers. Some of the described functions may also be performed (fully or partially) on the client side.

Experiment creator 241 may create a new experiment based on an experiment specification provided by a developer. The specification itself is typically created using standard editing tools and experiment creator 241 may check that the experiment is fully formed and correctly specified. The specification is typically embedded in the source code and web page files created by the developer (e.g. as part of the source, specialized comments or other directives). Experiment creator 241 may inspect and analyze this code to extract the experiment specification elements from it and may unite such extracted elements from multiple source code and web page files.

Experiment integrator 242 may integrate the newly created experiment into system 100 and conflict resolver 248 may resolve any conflicts and dependency issues with already existing experiments.

Experiment configurer 243 may configure the newly integrated experiment defining how it should be run including, which is the target population, according to input from an experiment administrator. It will be appreciated that the experiment administrator may be the developer assigned to administrate system 100.

Experiment manager 244 may manage and coordinate the experiment as it is running including selection of the experiments to be applied to each user, any conflict resolution, implementation of the actual experiment data collection and communication with BI server 250 and any external influencers such as development managers.

BI server 250 may be a separate server and may be dedicated to analyzing experiment results as well as other system business intelligence.

It will be appreciated that all the server functionality discussed herein above may be implemented using multiple servers for each function, located in one or more server farms, or may be united or otherwise co-hosted using a different server set combination.

Experiment server 240 may manage experiment database 245, including experiment details, relationships etc. and may support experiment integration, setup and running as described below. It may also perform experiment consistency checking, provide user population selection services and provide variant selection services. In a typical embodiment experiment server 240 may be split into two parts: an experiment handling server and a management/UI server. Thus experiment managers may work with the UI server which would use an API provided by an experiment handling server. Thus experiment server 240 may also serve as a communication interface allowing developers users etc. to input specifications, state maps, modifications etc., but also to receive warnings, BI reports etc. in order to promote decision making.

System 100 may utilize the approach of merging the multiple different experiments (as described herein above) under a single unified framework. This may greatly help experiment developers, since the collected experiment result BI may correctly describe all system changes that have occurred during the experiment period. This may prevent cases in which observed experiment effects are due to "non experiment changes" and cannot be related to a specific experiment.

It will be appreciated that an implementation of system 100 may choose to implement some system elements separately of the experiment management system—either completely separately or using an external mechanism in addition (and in parallel) to the experiment management system in question (such as a separate version control system). However, this may only be done if the system elements affected by these separated system changes are clearly distinct from the user-facing experiments activity and do not affect experiment data collection.

It will be further appreciated that the following discussion is typically applicable to client-side experiments, in which the version of the client code can be customized for the experiment configuration used by the specific user. This can be done, for example, by modifying the client code (on the server) before it is downloaded by the specific user, or by performing the code modification on the clients' machine based on a generic code modification component and a downloaded codebase which include the underlying code for multiple experiment variants.

However, in different embodiments, experiments may also involve variations of server side code, requiring different users to interact with different (modified) versions of the server. System 100 may implement these variations in a number of ways, such as by using switched code (as described in more detail herein below) or by using separate server-side threads which run the multiple versions of the code and by using different servers to run different version of the code—possibly in different server farms. This could be coordinated with experiments open for a given geography (e.g. loading servers which serve users in country X with experiments open to users in country X) or otherwise assigned.

System 100 may also integrate these variations with the load balancing infrastructure of the system so that a specialized experiment-aware load balancer would connect user sessions to the server running the appropriate server configuration. Such a load balancer could also provide information about the demand level for different server configurations (including the geographical origin of such demand), allowing the system to allocate different servers with different server software experiment configurations in the best way to meet demand.

It will be appreciated that the selection of server experiment implementation technique may depend on the number of possible server configurations. Some techniques can handle any number of configurations (e.g. switched code), whereas other techniques may only handle a small number of configurations (e.g. server allocation).

Figure 5:
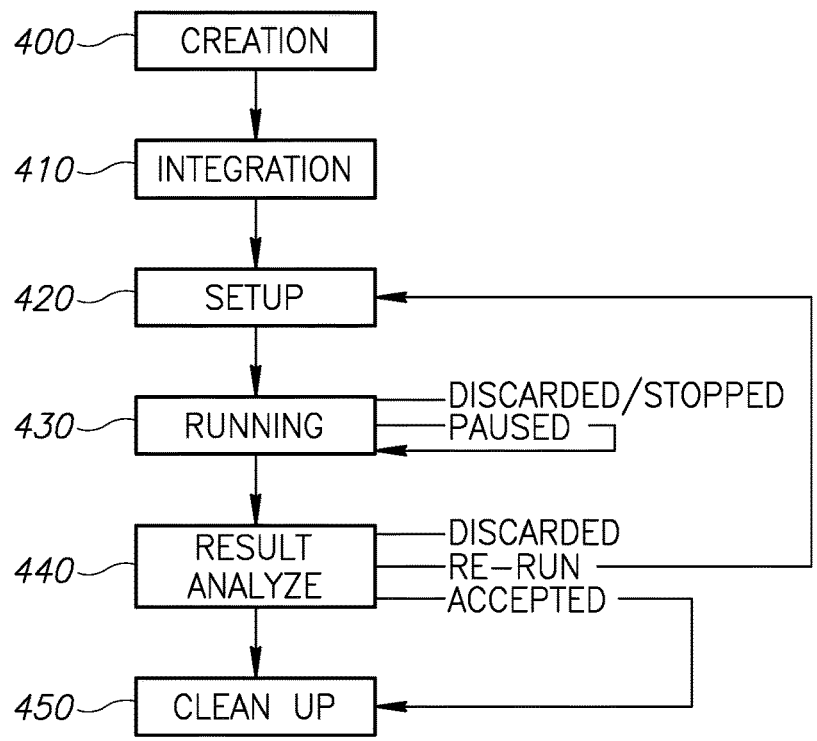
FIG. 5 is a flow chart of the experiment lifecycle stages.

As discussed herein above regarding the functionality of the elements of system 100, the experiment life cycle consists of the following main stages as are illustrated in FIG. 5 to which reference is now made.

Experiment creation (400) (performed by experiment creator 241)—receiving an experiment specification and setting it up accordingly (e.g. when depositing new code/data or code changes). The result of this stage is a well-defined experiment, which has an associated specification, but has not yet been integrated with existing experiments.

Experiment integration (410) (performed by experiment integrator 242)—integrating the definition of the experiment into the existing set of experiments and checking for interaction and conflicts with existing experiments. When integration is complete, the experiment is deposited into the system, passes initial checks and becomes an "eligible experiment" that can be started when needed. No end user is affected yet (as described in more detail herein below) and the experiment can (for example) be used by explicit invocation (e.g. by the QA department or for internal review by other developers).

Experiment setup (420) (performed by experiment configurer 243)—defining the affected user community and activating the experiment. Additional conflict checking may occur at this stage (as additional information regarding experiment interaction is defined at this point). At this stage the experiment may be run on a subset of users, but only explicitly and not through its application to users entering the system in the regular manner.

Experiment running (430) (performed by experiment manager 244)—running the system with active experiments (which are applied to entering users) while it collects the results. This stage also performs the final conflict checking and resolution. The experiment may be paused and re-started during this stage (e.g. due to some issue discovered during running which requires detailed analysis), and may also be discarded/stopped (e.g. if proven buggy or otherwise problematic even before final results are known). During this stage, experiment server 240 may also send specific alerts i.e. it may send an alert when an experiment is opened but no users are selected after an X time frame (possibly due to incorrect experiment design or conflict issues) or when a given experiment has reached a pre-specified number Y of users (which received variant B instead of the regular B).

Experiment manager 244 may also perform specific actions (such as pausing the experiment) instead of or in addition to sending the alerts as described herein above.

Experiment result analysis (440) analyzing the collected results of the experiment, based on which the experiment may be handled as follows:

Discarded (i.e. if failed)—and disabled for all users.

Accepted (i.e. if succeeded)—and thus expanded to cover the entire (100%) user population, until it is further merged into the baseline (in the cleanup stage below).

Re-run—including possible modification to the underlying experiment, as well as to the population selection criteria (PSC) used.

Experiment cleanup (450)—in which the remaining fully accepted experiments are merged into the baseline to create a new baseline, and this new baseline is deployed.

It will be appreciated that the stages as defined below may be performed by either individual elements or a combination of the elements of system 100. In a different embodiment, the experiment creation and integration stages may be combined, i.e. experiment creator 241 and experiment integrator 242 may be considered a single element. For example, a single element may extract the experiment definition from the source modules, build an experiment spec, and immediately perform the initial integration.

Thus an experiment may be created by the developer who creates a change to the underlying system. Such a change may include new component(s) creation, component deletion or modifications to existing components. The change may also include changes to data objects or the underlying website building system data. The experiment may be defined through a specification which may provide details about the experiment and the participating components. The specification may be provided by adding a separate specification file (for a set of changed components), by adding a collection of files (e.g. per affected component) which together form the specification, by adding an embedded section in each affected components or by adding part of the check-in comment for each relevant component when deposited into a source control system. It will be appreciated that an experiment may include changes to data objects and website building system-based pages.

Experiment creator 241 may receive an incoming specification from a developer and may create an experiment definition. An experiment definition may consist of an experiment header, experiment script and experiment relationships definition. It will be appreciated that for an experiment which consists of multiple components, the elements of the specification may be divided between multiple specifications associated with the multiple components. Experiment creator 241 may also perform a scan to collect all specifications related to a given experiment.

The experiment header may include heading information and meta-data such as: experiment description, creator and scope—the general area (or subsystem) in the system which the experiment affects, e.g. "the document editor". The experiment header may also include requirements such as "can be run only when the user is logged in" and "can run only within the system editor".

The experiment header may also include the experiment spider/bot access flag, i.e. whether the experiment should be applied only for regular user (i.e. non-spider) access, only for spider access or for both. Except for spider-related experiments, most experiments may be assigned the 1$^{st}$ option (only for regular users). It may also include the ID type to use as controlling ID (e.g. the user ID, repeating anonymous user ID, site ID) as described in more detail herein below.

The experiment header may further include the measured events for the experiment. This is the set of events which provide information indicating if the experiment was successful or not. For example, if the experiment involves a new button, a measured event would be this button being pressed. Measured events are discussed in more detail herein below.

The experiment header may also include a list of participating components for the experiment to which experiment scripts (also known as patch scripts) are applied. The list may be generated by scanning the components in the system and searching for per-component scripts which are identified as belonging to a given experiment. It will be appreciated that this may require scanning the components in an underlying website building system data repository, as website building system-based components may be included. As discussed herein above, the component-experiment relationship may be n:m. Thus, a single component may be associated with multiple per-component scripts (one for each experiment in which the component participates). Experiment creator 241 may collect these per-component scripts to create the full experiment script as described in more detail herein below.

In an alternative embodiment the list may be explicitly specified. However, this may create inconsistencies between the list and the actual set of per-component scripts.

Experiment creator 241 may generate an experiment script by collecting multiple per-component scripts associated with the given experiment. As discussed herein above, an experiment script may include any combination of changes to source (interpreted) code, compiled code, data and website building system structures. Thus, a single experiment may combine, for example, changes to underlying system source code and changes to parts of the system constructed using an on-line website building system (i.e. automatically generated at run-time from user-defined data structures) and all of these changes would be tested together as a single experiment.

The experiment script specifies the exact objects inside components (e.g. Javascript classes and data objects names) which are affected by the experiment, and the changes made to them when the script is activated. An experiment may make changes to multiple classes. The experiment may also include completely new classes and data objects to be added to the system.

It will be appreciated that changes to the source code (classes) may include: add method, remove method, replace method, add method to be executed before, add method to be executed after and replace method with a wrapper who calls the method (instead of making direct call to the method).

It will be further appreciated that these changes may affect the function prototype, though this is not typical. This could happen if an experiment includes coordinated changes to two classes (c1 and c2) and changes method heading so that the changes to both c1 and c2 are coordinated. However, such a change may cause external references to the methods (in classes other than c1 or c2) to fail.

Experiment creator 241 may also implement switched code, which performs (for example) both versions of the A/B test, depending on the value of a given switch or parameter. In this case, the experiment will modify just the value of given switch or parameter.

Experiment creator 241 may also make changes to complied code (including compilation into bytecode) by modifying the binary or bytecode files, replacing method calls with calls to encapsulating methods. For example, to implement a pre-call method C (to be called before calls to method A), experiment implementer 320 may replace calls to the target method A with a call to a newly created encapsulating method B which then calls the pre-call method C and then the original method A. This may be applied (for example) to complete executable images, or to dynamic linked libraries (DLLs) before the linking phase (and can then be done by changing the DLLs symbol table). This method will not work with single line code changes and similar editing.

Experiment implementer 320 may perform such processing dynamically, based on the active experiments for the specific user.

Thus experiment creator 241 may inspect the source material for an incoming experiment specification in order to create an experiment script containing a modified version of the source material and possible auxiliary data structures that may be later implemented by experiment implementer 320 (and experiment implementation module 56) during runtime as described in more detail herein below. It will be appreciated that the experiment creator 241 may function only once for each experiment at the setup stage whereas experiment implementer 320 (and experiment implementation module 56) may be invoked millions of times—each time a user enters the system as discussed in more detail herein below. This may provide a large saving in processing time and potential bandwidth use at the experiment implementation stage since there may be thousands of open experiments running at the same time with a lot of material to be downloaded to client code 50.

It will be appreciated that during runtime, some of the functionality of experiment creator 241 may also be performed by experiment implementer 320 (and experiment implementation module 56). This would change the balance between the pre-processing work done by experiment creator 241 (creating the relevant experiment data structures stored in experiment database 245), and the final implementation done by experiment implementer 320 (and experiment implementation module 56) based on the data structures.

As discussed herein above, source material may include:

Source code—including compiled as well as interpreted languages.

Binary code—including compiled code and bytecode files.

"Web material"—including HTML, XML, CSS, . . . ;

Website building system data—including data structures, contained components, website building system data items, templates, views, etc. This may also include non-page (or even non-displayed) material, such as marketing and metadata information about a third party application in the website building system app-store as discussed in more detail herein below.

Experiment creator 241 may also implement switched code, which performs (for example) both versions of the A/B test, depending on the value of a given switch or parameter. In this case, the experiment may modify just the value of given switch or parameter.

Experiment creator 241 may also make changes to complied code (including compilation into bytecode) by modifying the binary or bytecode files, replacing method calls with calls to encapsulating methods. For example, to implement a pre-call method C (to be called before calls to method A), experiment creator 241 may replace calls to the target method A with call to a newly created encapsulating method B which calls the pre-call method C and then the original method A. This may be applied (for example) to complete executable images, or to dynamic linked libraries (DLLs)

before the linking phase (and can then be done by changing the DLLs symbol table). This method will not work with single line code changes and similar editing.

It will also be appreciated that data object changes may be similar to source code changes, and may include (for example) adding members to structure data objects (e.g. arrays), adding fields to structures (similar to method handling as discussed herein above). The system may also include elements (e.g. pages) created through a website building system—either because the underlying system itself is a website building system (which is used to define some parts of itself) or by using a separate website building system.

For website building system-based changes, system server 210 may store the website building system site definitions, for example, using a standardized representation (e.g. XML, JSON) or using a proprietary data format. The experiment may include modifications to such data structure, which may be tailored to the specific data format. For example, XML-based WBS page definitions may be modified using XSLT transformation definitions.

Website building system-related changes due to version selection may affect the size and position of components inside website building system pages displayed to the user. This may affect related or adjacent components through the use of dynamic layout anchors which would modify these related or adjacent components so the page would maintain its arrangement. In this case, the B-version selection would serve as dynamic layout trigger. Dynamic layout anchors and triggers are more fully described in U.S. patent application Ser. No. 13/771,119 titled "A server-based web site design system integrating dynamic layout and dynamic content" filed on Feb. 20, 2013, by the joint assignee of this patent application, and issued as U.S. Pat. No. 10,185,703 on Jan. 22, 2019, and incorporated herein by reference.

Experiment integrator 242 may integrate the created experiment into the central code repository without activating it. It will be appreciated that this integration is used initially for QA runs (with the QA team activating the experiment manually), or only later for external testing—using the A/B testing mechanism.

Conflict resolver 248 may check the experiment for consistency with the existing system and any open and paused experiments (since even paused experiments may already be active for some users). It will be appreciated that some consistency problems may be classified as "error level problems" which may prevent experiment integration, whereas some consistency problems may be classified as "warning level problems" which may not prevent experiment integration (e.g. as discussed herein below). This is called the primary consistency check. It will be appreciated that the check may include combinations of experiments which are actually open to different populations and are expected to remain so (e.g. code implementing a Japanese version of the system is checked against the code to implement a French version of the system).

Possible problem cases may include experiments that depend on components or methods which have already been removed from the system. Problem cases may also include inconsistencies between experiments, such as experiments E1, E2 and E3 which are defined with the following experiment relationship types:

(E1<MI> E2) and (E2<ME> E1)—(E1 must include E2) and (E2 must exclude E1);
(E1<MF> E2) and (E2<ME> E1)—(E1 must follow E2) and (E2 must exclude E1);

Other problem cases may include order problems, such as dependency circles, for example:

(E1<MF> E2) and (E2<MF> E3) and (E3<MF> E1) (error level)—(E1 must follow E2) and (E2 must follow E3) and (E3 must follow E1);
(E1<MF> E2) and (E2<SF> E3) and (E3<SF> E1) (warning level)—(E1 must follow E2) and (E2 should follow E3) and (E3 should follow E1);

Conflict resolver 248 may also check for ambiguity and/or collisions. For example, both experiments E1 and E2 may modify the method X of the module Y, but there is no order defined between them. When multiple experiments modify different methods of the same module, system 100 may be configured to classify this as collision or not (i.e. configured for different collision checking granularity). Conflict resolver 248 may allow co-resident experiments to have collisions (even when enabled and running) as this can be resolved using conflict resolution techniques as described in more detail herein below.

It will be appreciated that collisions in accessing website building system objects, e.g. experiments E1 and E2 both modify the same website building system object components (and in particular the same attribute) and therefore may also create a problem case. This may be extended to contained objects (e.g. experiment E1 modifies the color of the component X and experiment E2 hides the container containing X).

Another issue may be indirect interactions, e.g. experiment E1 modifying the behavior of API module X, and experiment E2 using API module X (even if not modifying it).

Experiment integrator 242 may correct any experiment (which may be in the experiment specification as well as the underlying code or data changes themselves) and re-integrate the experiment. Experiment integrator 242 may also report the process to BI server 250 which may log experiment integration work as part of the experiment history.

Experiment integrator 242 may also allow experiments with a warning-level-only (or even some error-level) problems to remain in the deposited codebase, as they may be resolved during run-time by active conflict resolver 370 (as described in more detail herein below).

As experiments typically involve modifying code and data structures inside the system, the order in which experiments are applied is critical to the system. As discussed herein above, the relationship may include dependencies and conflicts as well as additional information which support conflict resolver 248 in resolving the conditions for the inclusion of the experiment and the order in which it should be applied.

Relationships may be between two experiments (A relates to B), or between a given experiment and all other experiments. It will be appreciated that a relationship between experiments may exist even if they do not affect the same methods or components. For example:

Experiment A which changes a given button to the color red is mutually exclusive (<ME> below) with experiment B which changes the background of this button to the color red. Such exclusion would be required even if the button drawing and background drawing are handled by separate and independent parts of the system.

Experiment A uses API X (but does not modify it) and experiment B modifies API X.

Relationships types may include any of the following:

| Category | Code | Relationship | Description |
|---|---|---|---|
| Inclusion/ exclusion | <MI> | Must include | If [A <MI> B], then A may only be applied if B is applied as well - either before or after A. |
| | <ME> | Must exclude | If [A <ME> B], then A may only be applied if B is not applied at any point - either before or after A. |
| Order | <MF> | Must follow | If [A <MF> B], then if A is applied, B must be applied before it. B will be activated and applied in such a case, even if B was not otherwise expected to be applied. |
| | <MP> | Must precede | If [A <MP> B], then if A is applied, B must be applied after it. B will be activated and applied in such a case, even if B was not otherwise expected to be applied. |
| | <SF> | Should follow | If [A <SF> B], then if both A and B are applied, A must be applied after B. If just A is applied, B will not be applied automatically. |
| | <SP> | Should precede | If [A <SP> B], then if both A and B are applied, A must be applied after B. If just A is applied, B will not be applied automatically. |
| First/last requirement | <MBF> | Must be first | If A is <MBF>, it must be the first experiment applied - there cannot be multiple <MBF> experiments applied at the same time. |
| | <SBF> | Should be first | If A is <SBF>, it should be the first experiment applied. However, if there are multiple <SBF> experiments, they would be applied after any <MBF> experiment, before non-<SBF>/<MBF> experiments and in any order between them (subject to order relationships above). |
| | <MBL> | Must be last | Similar to <MBF> above but at the end. |
| | <SBL> | Should be last | Similar to <SBF> above but at the end. |

It will be appreciated that the first/last requirement above can be further extended by having priority levels (e.g. starting with level 1 experiments, then level 2 experiments etc.).

An additional possible relationship is connected experiments. An experiment E2 can be designated as connected to experiment E1. Experiment E1 may be designated as the leading experiment, and E2 is the trailing experiment. More than one such trailing experiment can be connected to a single leading experiment.

If two experiments E1 and E2 are connected, users are always included or excluded together in both experiments, i.e. both experiments use the same variant selection.

Connected experiments should all use the same population selection criteria; otherwise, the "extra possible users" in experiment E1 as compared to a connected experiment E2 (for example) may not be able to use both E1 and E2 together.

In cases in which variant selection is performed according to the experiment ID (as discussed in more detail herein below), the variant selection for both experiments may be done according to the leading experiment's ID. Except for this aspect (experiment ID usage), the relationship is commutative (symmetric)—if E2 is connected to E1 then E1 is connected to E2.

Yet another possible relationship is dependent experiments. An experiment E2 (or multiple experiments Ex) can be designated as dependent on experiment E1. In such a case, experiment E2 would only be enabled after experiment E1 was fully accepted and opened to 100% of the users.

For example, a website building system editor feature (represented by experiment E2) which may only be enabled after a matching website building system viewer feature (represented by experiment E1) is fully tested and was open to all users. This would prevent website building system designers from using the feature E2 and designing a web site page which cannot be viewed by someone using a website building system viewer without experiment E1 and before experiment E1 was fully tested.

It will be appreciated that system 100 may also implement multi-dependency, e.g. an experiment E3 depends on the set of experiments E4, E5 and E6. Such a multi-dependency definition may be AND-based (i.e. experiment E3 can only be enabled after experiments E4, E5 and E6 have all been fully accepted) or be OR-based (opening experiment E3 when any of experiments E4, E5 or E6 have been fully accepted).

It will also be appreciated that the semantics discussed herein above have been defined in terms of A/B testing, in which an experiment is either applied or not. However, the semantics above may be extended to multivariate tests, in which there are multiple B-variants of the experiment. In such a scenario, there may be two different embodiments.

In one embodiment, relationship operators may apply to the entire set of B-variants which are batched together. For example, if a multivariate experiment E1 has a variant set consisting of A (the baseline version) and B1 . . . B10, the relationship definition would apply to the entire set of BL . . . B10 together and not to a single Bx, e.g. Bx (of E1)<Must Follow> Bx (of E2).

In a second embodiment each of the multiple B-variants Bx is handled separately and may have its own separate relationship definitions. Thus, for experiments E1 and E2, each of which having the B-variants B1/B2/B3, B1 (E1) <MP> B2 (E2) while B2 (E1)<SF> B1 (E2).

Thus the second embodiment can produce more complex definitions which may be harder for conflict resolver 248 to resolve.

It will be appreciated that an experiment conflict may occur (for example) when two experiments modify the same method (or methods), or alternatively (in some embodiments of the system) when two experiments modify the same component (even if they do not modify the same method)—and unless the conflict has been resolved in one of the ways detailed below.

Conflict resolver 248 may use techniques which may be fully automatic (i.e. performed detection of conflict) or partially automatic (i.e. performed by conflict resolver 248 based on interaction with the developer or experiment manager).

Conflict resolver 248 may initially detect conflicts with a consistency check and may mark the two (or more) conflicting experiments accordingly. Conflict resolver 248 informs the developer integrating the new (and conflicting) experiment of the details of the conflict, and allows him to resolve the conflict.

If, for example, conflict resolver 248 detects upon integration of experiment B into the system that B conflicts (for example) with an existing experiment A, the developer is warned and may resolve the problem using a combination of any of the following ways:

Cancelling the integration of experiment B.

Terminating experiment A (discarding it or merging it into the system).

Creating a new experiment C and have A and B depend on C.

Perform source code changes which reconcile A and B, preventing their conflict (e.g. create two separate versions of the method at the base of the conflict).

Specify that A depends on B (or vice versa)—which could be soft ("should follow") or hard ("must follow") dependency. Such dependency specification is "on top" of the dependencies including the experiment relationships definition (which were part of the original experiment specification).

It will be appreciated that combinations could include, for example, partial reconciliation of the code combined with an add dependency specification. Alternatively, the developer may still integrate B into the system without fixing the conflict. Conflict resolver 248 may mark the conflict specific database as described herein below.

Alternatively, in the specific case in which two experiments modify a method A, conflict resolver 248 may create two copies of it (A1 and A2) and have each experiment modify its own copy. This is not an ideal solution, as it tends to inflate code and may require future merging.

It will be appreciated that creating a large number of dependencies may be problematic. Assuming (for example) that experiment A depends on B:

Experiment A may be successful and B not so, but we will still have to add B since A relies on it.

Experiments A and B may have different schedules of development, adoption etc. In particular, experiments which modify major features (e.g. "save site" in a website building system system) are applied very carefully, going through a lot of steps. Thus, a large number of dependencies even if easy to resolve, may not be beneficial to the development of the system.

It will be appreciated that relationship types (including leading experiments and connected experiments), possible conflicts and conflict resolution process may be similarly applied to A/B tests (including multivariate tests), feature toggles, system upgrades and marketing campaigns, as well as between the different experiment categories.

For example, a marketing campaign may depend on the existence of a certain system upgrade as well as the existence of a specific feature toggle. As another example, a given system upgrade may be flagged as "must follow" another system upgrade.

However, system 100 may be configured (based on the priorities of the organization in which it is installed) to assign different priorities to different experiment categories. For example, system 100 may be configured to assign a lower priority to experiments compared to system updates, so in case of conflict between a regular experiments and a system update, the system update would be preferred.

Once the experiments are integrated, experiment configurer 243 may configure the experiment to be run according to a population selection criteria as defined by the experiment administrator and any state maps as discussed in more detail herein below (if relevant). It will be appreciated that once experiments have been integrated by experiment integrator 243, they must be managed: activated, tracked, redefined (in terms of relevant population), de-activated, etc. This can be done by individual developers (handling their own experiments), by product manager or by other authorized persons in the organization.

Experiment configurer 243 may also comprise a population expander 247 which may expand the desired target population of an experiment (even while the experiment is active) based on results from experiment analyzer 251 as described in more detail herein below.

As discussed herein above, the experiment administrator may define the population selection criteria and the controls for variant selection. For binary experiments, population selection criteria may specify when variant B should be selected instead of the default variant A. For multivariate experiments, the population selection criteria may be associated with each of the non-default variants to specify when this variant is selected.

The experiment administrator may also define the population selection criteria for the experiment which may depend (for example) on any of the following user properties: user status (anonymous, guest, registered, premium, . . . ), user profile/attributes (age, gender, . . . ), user e-mail (e.g. apply to all users with e-mail suffix "@nyu.edu"), the geographical location of the user (as detected via IP address, GPS etc.), the system use history for the user, (e.g. user registered for over X years, users used advanced feature X, user logged in more than X times last month, . . . ) and the environment parameters of the user (e.g. browser, operating system etc.);

The population selection criteria may also depend on web site related parameters (e.g. web sites having >X pages, web site using specific templates, pages which have another component Y beside the tested component Y, specific web site hints as well as third party application (TPA)/AppStore related parameters (e.g. limit to new third party application purchasers, limit to existing third party application users, purchase history, installed third party applications, method used to locate a third party application in AppStore, . . . )—in particular for experiments defined by third party application providers as described in more detail herein below;

The population selection criteria may further depend on a specific user inclusion list, possibly based on system-internal criteria (e.g. all users which registered during the last month), a specific user exclusion list (e.g. never display experiment E to users in the US or to users X, Y and Z) and the variant percentage (e.g. use for X % of the users).

It will be appreciated that the population selection criteria may combine these conditions using Boolean operators, e.g. "apply experiment E1 to (10% of users where [Geo=India or Geo=Russia]) and (20% of users where [Age>25 and [used extended editor feature >3 times in the last month]])".

It will be further appreciated that some of the variables evaluated by the population selection criteria options above may change over time. For example, the population selection criteria includes users who entered the system X times during the last month, the selected users would change over time with users being added to and removed from the list as time passes. Experiment configurer 243 may check the values when an initial experiment variant selection is performed, and the condition is not re-evaluated when the user re-enters the system.

Thus experiment configurer 243 may configure the experiment according to the selected variants and population. It will be appreciated that experiment selector 310 may assign a user an experiment based on the population selected criteria as defined by the experiment administrator. It will be appreciated that a state map is a data structure which may specify the status and selected value for a set of experiments registered in system 100—and thus what component combination is included in the running system. State maps may be supplied by both users and developers or may be retrieved from storage in order to manipulate or override settings for existing experiments. For example a developer may submit a state map to specify that a particular experiment is run with a certain version of the software (e.g. for testing) or a user might ask to participate in a particular experiment instead of being assigned one randomly (e.g. an advanced user which would like to focus on a new, not fully released feature).

Figure 6:
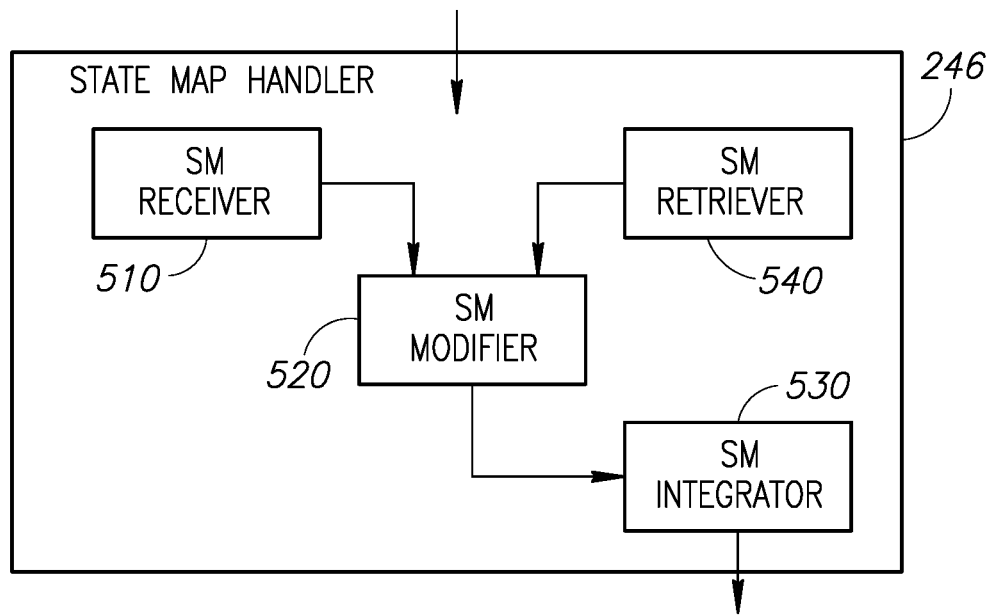
FIG. 6 is a schematic illustration of the elements of the state map handler of FIG. 3, constructed and operative in accordance with the present invention.

Reference is now made to FIG. 6 which illustrates the elements of state map handler 246. State map handler 246 may comprise a state map receiver 510, a state map modifier 520, a state map retriever 540 and a state map integrator 530.

State map receiver 510 may receive a state map from a user or developer wishing to manipulate or apply the provided state map, state map modifier 520 may modify a state map accordingly and state map integrator 530 may integrate the state map into the current experiment. State map retriever 540 may retrieve a state map from storage as per a user request.

It will be appreciated that there are two types of state maps (according to a flag in the state map data structure), static and dynamic.

A static state map may define an exact experiment configuration which may not be modified by additional variant selection. When used, experiment configurer 243 may configure these experiments as is and does not perform variant selection for new experiments—even if there are such new experiments that are active and applicable. Static state maps are necessarily fully elaborated, i.e. detail each and every participating experiment. Non-included experiments are assumed to use the (default) A-variant.

If a static state map refers to a terminated experiment (discarded or accepted), the experiment variant may still be recovered (e.g. from a system source repository) and applied if possible. Thus, static state maps are never obsolete and may be used to refer to past system configurations (as long as they are available in the repository). A static state map may be used to specify a version sent to quality assurance (QA) for testing—so QA can test on a consistent configuration identical to that used by the developer. Static state maps may also be used in a similar manner for user support—so a support person can recreate a condition reported by a user of the system. Unique static state maps have a unique ID (SM ID) and are stored in experiment database A developer or user may define a dynamic state map through a query which may combine any of the following: the existing baseline (general availability), all new open experiments, specific added modules not registered in experiment server 240 and specific experiment assignments;

An example query would be "[Use GA]+[exp1 v2.6 from/usr/me/xx.jar]+[exp2=yes]+[exp17=variant #4]" "use the general availability baseline (GA), apply version 2.6 of an experiment called exp1 extracted from the code repository in/usr/me/xx.jar, apply binary experiment exp2 and apply the version called 'variant #4' of the multivariate experiment exp17.

It will be appreciated that dynamic state maps cannot be used for internal QA, since they rely on the baseline (general availability) which may include (other) experiments which may appear or disappear at any stage.

Dynamic state maps may be "partial" in nature, since new experiments may be added to system 100 after the user has begun working (in the same session or in follow-up sessions for the same user). In such a scenario, for an on-going session, state map handler 246 may continue to use the same experiment configuration determined when the session has started.

For new sessions, state map integrator 530 may reapply the existing variant selection for the previously selected experiments, and perform variant selection to the added experiments which were not yet selected.

If a dynamic state map refers to a terminated experiment (discarded or accepted), state map integrator 530 may remove this reference and not apply the terminated experiment.

Dynamic state maps are not stored in database 245 and state map converter 220 may not assign them a unique ID, since there could be an extremely large number of them (e.g. 20 binary experiments may generate $2^{20}$ state maps). When a user enters the system, and variant selection is performed (as discussed herein above), the specific state map for the user is not stored in database 245, but is reported as a part of an initial business intelligence which may detail the full experiment configuration. It will be appreciated that the future use of client 50 within the same session may assume that the state map and exact experiment configuration remain the same.

A state map structure may consist of the following elements:

A state map header, containing relevant state map flags and meta-data.

A list of code (modules/components/artifacts), data and website building system elements referenced in the state map. These may include elements which state map handler 246 may draw from system repositories or data sources, as well as specific local/remote elements (e.g. specific by an experiment developer). The list may include version information for the elements (e.g. include source element a.jar, version 3.2).

A list of statuses (yes/no, variant selections) for specific experiments in the code/data/building system elements as noted above.

State map receiver 510 may accept a state map or a state map ID as a parameter in the URL. This can be used, for example, by a support or QA person wishing to recreate the specific (client+server) configuration used by a given user requiring support.

State map modifier 520 may also create a state map constructed based on an existing state map (e.g. specified using a state map ID) to which a set of modifications may be applied—such as "SMID=12345, NewButton=yes, SaveDialogVers=3". This may be used, for example, by the QA team when testing a specific experiment which has not yet been enabled for outside users. It can also be used by an external (e.g. Beta) user to enable an experiment not open to the general public.

Baseline coordinator 360 may also use state maps to describe each new baseline as described in more detail herein below. The state maps describing the new baselines may be stored in the database 245 in order to allow the retrieval of a timeline described by state maps per time to track version release and to support exact rollback to previous baseline.

It will be appreciated that the state map structure as described above typically refers to experiments which have already been deposited into the central code repository, and registered with the experiment management system and are referenced by their experiment name. This may apply to both regular (static/dynamic) state map structure as well as state maps generated using a modified state map ID (i.e. an SM ID with added specific experiment). However, and as discussed herein above, system 100 may support non-deposited experiments, and in particular experiments (under development) which include non-deposited components. Such experiments may refer to external components using a number of methods, such as referring directly to a file using a file name path, e.g. /users/john/proj/new.jar, referring to a file via a URL and referring to an experiment using an identifier associated with a source code control system or other repository (so that the experiment management system can be integrated with the repository for the organization, for example). This may include a version indication (e.g. use experiment from source control named xyz.jar, version 10.3).

It will be appreciated that all of the above may apply to data-oriented modifications (e.g. modification to website building system pages) as well as to code-oriented modifications. Furthermore, state map handler 246 may combine the above methods, e.g. referring to a specific state map ID with an added registered experiment and another added non-registered experiment based on a local machine file.

It will be further appreciated that when state maps refer to such un-registered experiments, the experiments were not processed by experiment creator 241 and experiment integrator 242. However, the required consistency checking and experiment ordering may be performed during the experiment running stage by experiment manager 244 (as described in more detail herein below) using consistency checking code running as part of the experiment server, the client code of the system or otherwise.

It will be appreciated that the development cycle may be integrated with the use of state maps using state map operations as described in more details herein below.

A developer may wish to receive a list of all deployed experiments, together with the version and status for each deployed experiment. A developer may retrieve a state map of the current state of the production code (via state map handler 246), and add specific changes to create a modified SM (e.g. MyNewEditor-1) for use by the developer. The developer can also create a temporary state map and give it a name—later modifying it by merging with additional changes which is then uploaded back to state map handler 246.

Thus a developer can then develop a feature using a static state map without having to tackle system changes during development. A developer may also transfer code to QA together with the state map used for development. QA may determine that the state map is too old and require the developer to re-test with up-to-date state map.

It will be appreciated that QA may unite state maps associated with the code created by multiple developers in order to test code together for a number of features and save QA time. Such merging of multiple state maps may also be used by QA to create a new production state map containing multiple new tested components. Conflict resolver 248 may also be used to detect conflicts and dependencies in such merged state maps, warn about them, and resolve them (automatically or interactively).

As discussed herein above, state maps may also be useful to end users. Each user invoking system 100 may receive a different version of the system based on explicit invocation of a specific state map (e.g. in the system invocation URL), or as internally determined (as created by site map handler 246) based on new or previous variant selection results.

System 100 may store the variant selection results for a given user as well as the fact that a variant selection has been performed for given experiments (i.e. the user is a "selected user" for these experiments). This information may be stored on user server 220 (in user database 225, in another database etc.) or on client 10 (using a cookie, a local file, or any other persistent storage mechanism). Alternatively, in some embodiments, variant modifier 380 may recalculate the variant assignment in a manner that is consistent between sessions.

It will be appreciated that the version (and state map) currently being used by an active user may differ from the latest regular deployed version of the system. The differences may be due to:

Users may receive the B-variant of a component (different from the deployed A-variant) due to AB-testing of an experiment involving the specific component.

Users may receive different versions of a feature toggle component if the feature toggle is conditional (e.g. depends on a user attribute such as geography).

The status of a feature toggle may have changed since the user started working.

An existing experiment may have been modified (e.g. a new version B2 of the B-variant component replaced the previous B1 version) since the time the user started a session, but the user did not reload the client software. In such a case, the user may be using the pre-modification version of the experiment. Note that the user may keep its selection status in such a case, e.g. if the user were "selected" to use the B-variant, it would continue to use the B-variant—just that B would now refer to B2 instead of B1.

The version (and state map) currently being used by a user may also differ if an existing experiment has been terminated during the user's session or if a system update has been performed since the user started working (i.e. a baseline update as noted above).

Once the experiment has been configured according to the required variants, population (by the experiment administrator) and state map (if relevant), experiment manager 244 may activate, manage, track, redefine (in terms of relevant population) and terminate etc. all experiments as described in more detail herein below.

It will be appreciated that once experiments are running, changes may be made to the experiment either manually (via a suitable interface) based on developer/user input or automatically based on data produced by experiment analyzer 251. Changes may include changing the state of an experiment—on, off, paused, expanding the experiment to include additional users (while preserving the experiment state for existing users), terminating an experiment, discarding an experiment (if the experiment failed and is no longer relevant), merging components into the baseline and merging experiments (creating a new experiment containing the two combined experiments). This can only be applied to experiments which have not been opened to users yet, as otherwise, when merging (for example) experiments E1 and E2, a specific user might have a A-variant selection in experiment E1 and a B-variant selection in experiment E2.

Experiments may also be split to create two new experiments E1 and E2 from an existing experiment E. An alternative implementation would create an additional experiment which is a "clone" of the current experiment. In this scenario, user variant selection for experiments E1 and E2 should be identical to the variant selection for E. Such a split usually occurs during development, and even before the experiment is open to users, e.g. when an experiment turns out to be too large or to have too many conflicts with other experiments. Often one of the experiments is "internal" and does not have a user-visible effect. The other experiment is a visible one, using an API provided by the "internal" experiment. This way the experiment developer can separate between the internal functionality and implementation and the external visible UI which may affect user choices.

There may also be a desire to change experiment content i.e. to leave experiment meta-data (header, name, . . . ) the same but to use different affected component(s) for the experiment or to change the measure events and to change the measured events and key performance indicators associated with the experiment.

System 100 may also support user group state maps which may assign a complete state map to a specific user group, e.g. "always apply SM17 to users ([named X, Y, Z] or [Geo=US])". This may differ from the regular mapping of experiments to users (and overrides it)—since it assigns a complete state map to specific users rather than specifying criteria for a single experiment at a time.

Once an experiment has been configured by experiment configurer 243, its running and monitoring may be managed by experiment manager 244. This is the stage during which system 100 displays a version of the system code adapted to the various experiments and data collector 350 may collect the results.

All results collected by data collector 350 may be sent to experiment analyzer 251 which in turn may return decisions that may influence both manually (i.e. via a developer) or automatically the running of a particular experiment and its particular variants as described in more detail herein below.

As discussed here in above and as is illustrated in FIG. 4 back to which reference is now made, experiment manager 244 may further comprise, an experiment coordinator 300, an experiment selector 310, an experiment implementer 320, an experiment overrider 330, an experiment terminator 340, a data collector 350, a baseline coordinator 360, an active conflict resolver 370 and a variant modifier 380. A typical flow is described herein below for a client-server document editing system, such as a server-based website building system. It will be appreciated that some of the tasks may be performed by different system elements than the elements described below (e.g. a task may be performed on the client instead of the server) or may be divided between multiple system elements. It will further be appreciated that the described sample flow may be based on per-user variant selection, while additional modes are available (such as per-document variant selection).

Experiment manager 244 may execute the flow below in order to handle all experiments in the entire system or by limiting experiments to these whose scope is that of the specific sub-system used (e.g. handle only experiments related to the system editor).

Experiment coordinator 300 may coordinate the flow of activity as the experiment runs. Experiment selector 310 may select the appropriate experiment for a given user based on the open experiment details and any user details. Experiment terminator 340 may terminate experiments based on data collected by data collector 350 and analyzed by experiment analyzer 251. Baseline coordinator 360 may update baselines accordingly and experiment overrider 330 may override the selection of experiments using override mechanisms as described in more detail herein below. Active conflict resolver 370 may resolve conflicts that may arise while the experiments are running. Variant modifier 380 may recalculate and modify the variant selection during runtime.

Experiment implementer 320 may implement a selected set of experiments for a given user (as determined by experiment selector 310) after any conflicts involving selected users and experiments etc. have been resolved by active conflict resolver 370. Experiment implementer 320 may also determine which experiments to configure for a given user based on user group state maps as discussed herein above.

It will be appreciated that while experiment implementer 320 may implement both client side and server side experiments, client-side experiment implementation module 56 may perform the same functions on the client side but only for client side experiments. As discussed herein above, experiment selector 310 may select an experiment set for a particular user based on the entered population selection criteria (as discussed in more detail herein above).

Alternatively, a user may enter system 100 and may request a copy of the system client code 50 to run on his user machine 10 from system server set 200. The user may be logged in or anonymous and may be a 1st time user or a returning user (possibly identified using a cookie on the user machine).

Experiment manager 244 may receive the request and retrieve from the various servers the user type (from login/cookie), the user ID, the user's geo location (from IP or otherwise), the user's profile parameters (e.g. age, gender, premium subscription status, etc.), any existing (saved) variant selection information—resulting from previous variant selection performed for earlier experiments. This could be (for example) in the user's profile, or saved in a cookie stored with the user. Experiment manager 244 may also retrieve any user environment information (software client version, browser type and version, system etc.).

It will be appreciated that the user ID is important as it may later be used as controlling ID for variant selection as further described herein below. However, in some cases a different ID should be used as a controlling ID:

In some cases, system 100 may use multiple ID's (of different types) for the same user. For example, system 100 may provide a specialized anonymous user ID for repeating anonymous users (e.g. tracking them through an inserted cookie). The regular user ID would only be assigned later when the user actually registers or logs into the system.

Experiment manager 244 may also mark an experiment as to which ID type to use. For example, an experiment aimed at repeating anonymous users may use the specialized anonymous user ID, whereas an experiment aimed at regular users would use the regular user ID. This mechanism may also be used (for example) for experiments which use the site ID as a controlling ID (as discussed in more detail herein below).

Experiment analyzer 251 may later correlate these multiple ID to create merged information reports (e.g. merged BI records under the anonymous used ID and the regular user ID of the same user).

It will be appreciated that in some embodiments, system 100 may use the ID of another user. For example, in a document sharing situation in which user X created a document A (e.g. a web site) and then allowed user Y to edit it, the system may use X instead of Y as the user ID.

This is done, for example, so that if user X was assigned to an experiment which includes a new component type R, and user X used an instance of R in the created document A, the user Y would be able to properly edit the document A and view the experimental component R.

In this case the user Y may get a different system GUI when he is editing user X's document (as compared to editing his own or other users' documents).

It will be appreciated that relying solely on a client-side mechanism (such as a cookie) for variant selection storage could be problematic (in terms of user experience consistency) as the user may enter the system from multiple clients (PC's, smart phones) and using different browsers.

Experiment manager 244 may accept the request and experiment configurer 243 may test if the user is a part of a user group for which a user group state-map is specified. If so experiment coordinator 300 may activate the state-map and set of experiments accordingly.

Otherwise, experiment selector 310 may calculate the set of experiments enabled for the specific user by reviewing the population selection criteria for all existing non-paused experiments. This may require checking of the user's history (e.g. if the population selection criteria specifies that the experiment applies to users who edited 3 different documents in the last month) or user profile fields. Experiment coordinator 300 may check this directly on experiment server 240 or through callbacks to the system server or BI server 250.

The resulting experiment set for the specific user at this time is referred to as a calculated experiment assignment. It may contain dependency circles and conflicts previously left resolved. Now that a variant selection has been performed on all experiments open for the specific user (including the specific population selection criteria as well as the X % determination), there may be a final set of dependency circles and conflicts to resolve.

It will be appreciated that unlike conflict resolver 248 which may resolve dependency circles and conflicts at the experiment integration or setup stages through interaction with the developer/integrator, active conflict resolver 370 may resolve all remaining conflicts and issues automatically. Active conflict resolver 370 may resolve based on experiment priority calculated based (for example) on a combination of any of the following: a priority assigned by the developer, a priority assigned by the experiment manager, the experiment scope (i.e. affected system area)—assuming some system areas are more important than others, the running time of the experiment and how close the experiment is to termination (based on achieving a statistically significant result)—possibly giving higher priority to experiments which are about to finish. It may also resolve based number of users affected by this experiment.

Active conflict resolver 370 may also detect any dependency circles in the calculated experiment assignment (not resolved before) and break them by dropping one of the experiments so as to break the cycle.

It will be appreciated that active conflict resolver 370 may drop an experiment so as to break a "should" relationship rather than a "must" relationship.

For example if "E1<MF> E2<SF> E3<MF> E1" (experiment E1 must follow experiment E2/experiment E2 should follow experiment E3/experiment E3 must follow experiment E1), Active conflict resolver 370 may remove E3 since the reliance of E2 on E3 is the weakest.

If there are multiple candidates (when there are no "should" relationships or multiple "should" relationships), active conflict resolver 370 may drop the experiment with the lowest priority.

It will be appreciated that active conflict resolver 370 may detect any conflicts in the calculated experiment assignment (not resolved before) and break each conflict by either using experiment separation so as to run each of the experiments on different populations (e.g. based on ID) as detailed below or by dropping one of the experiments (with the lower experiment priority).

It will be appreciated that experiment coordinator 300 may keep a count of artificial dropping of experiments, so as to detect if experiments do not "get their appropriate percentage" (due to excessive dropping), it may instruct variant modifier 380 to adjust the variant percentage appropriately.

Variant modifier 380 may perform variant selection for all experiments open for the particular user which do not have an existing variant selection (as described in more detail herein below). Variant selector 380 may base the variant selection on a controlling ID (the user ID in this case). The controlling ID is typically the user ID, but may also be (for example) a document ID.

Once experiment coordinator 300 has a final list of experiment statuses available for the user, it may sort the experiments according to their relationships. State map modifier 520 may create a combined (modified) state map and return new state map information and sorted experiment list to system server 210 which may accept the new state map information and sorted experiment list and store the sorted experiment list (e.g. in the users' profile, a separate database, a cookie on the users' machine, using local client storage etc.)

Experiment implementer 320 may apply the experiments according to their sorted order to create a custom version of the systems client code. This may include modifications to modules as well as loading of additional modules. Such application of the final experiment set may be done on the server (before sending the adapted client code version to the client machine) by experiment implementer 320, on the client machine (which performs the required code changes) by the client-side experiment implementation module 56 or by both working together.

Experiment coordinator 300 may report to experiment analyzer 251 all details of the experiments and variant assignments, as well as details of all circles/conflicts detected and their resolution and experiment implementer 320 may then send this version to client 10 for execution.

It will be appreciated that client code 50 may interact with the user, who sees the version containing the relevant experiment set. For per-document variant selection, per-document values and per-document profile should replace the per-user values above.

Alternatively, the experiment applying process may be performed on the client machine by client-side experiment implementation module 56.

Experiment overrider 330 may provide a number of mechanisms to override the default (pseudo-randomizing) variant assignment algorithm (as described herein above) and to assign specific variants to specific experiments.

Some mechanisms may be activated automatically or by system developers and support personnel. As discussed herein above, one such mechanism for override is through a user group state map assigning a complete state map to a specific user group (based on geography, specific attribute or otherwise defined). This is a server-based mechanism.

Another mechanism that may be invoked via experiment overrider 330 is through a cookie (for one or more users) which may be inserted through experiment server 240 which may request specific variant selections. This may be the same cookie used to detect re-visiting anonymous users. Like all cookie-based solutions, such a mechanism may not work for users accessing the system through multiple browsers.

Another mechanism is via a communication protocol. Experiment overrider 330 may implement a server-to-client communication protocol which may require the client to restart or hot-swap (if possible) with a different experiment configuration. This is relevant when the client code implements the experiment applying processing through a client-side experiment implementation module 56.

Alternatively, experiment overrider 330 may allow a user to invoke the system using a URL containing additional parameters (such as the dynamic state map/modified state map query strings as described herein above). Such parameters may include a fully or partially detailed list of experiments, and may be defined relative to the current baseline or to a specific state map. Experiment overrider 330 may also generate a unique URL (similar to the URLs generated by URL shorteners) to perform such override.

The example described herein above, assumes that the variant selections are stored, e.g. in system repository 215 or using a cookie on the user client machine. It will be appreciated that in some embodiments both methods may be undesirable since the repository storage method may require excessive database access across multiple servers and waiting for a user profile server to respond. It will be further appreciated that storing in a cookie on a user's machine may not work if the user enters the system through multiple devices or browsers.

In an alternative embodiment, system 100 does not store the variant selection details but rather recalculates them each time the user enters the system. Such recalculation is possible and may result in the same variant selection since it is based on user details which are assumed not to change (e.g. geography) and a X % user selection based on the user ID or document ID (which is also deterministic). Variant modifier 380 may determine if a given variant selection is stored or recalculated.

It will be appreciated that even though variant modifier 380 may recalculate, the expected results (and variant selections) may remain the same—the recalculations are expected to provide the same result each time.

It will be further appreciated that this may apply to A/B tests, multivariate tests and system updates. For feature toggles there is no random element and thus no need to store the variant selection which is always recalculated by variant modifier 380.

Even though variant modifier 380 may recalculate the variant selection (instead of storing it), the "selected user" bit for a given experiment must be stored. Thus there is no way to determine if a variant selection for a given experiment/user combination has been performed before without storing this fact.

It will be appreciated that a successful experiment might go through a number of expansion stages, in which it is typically opened to a gradually increasing number of users Population expander 247 may expand the population as required in order to enable experiment configurer 243 to re-configure the parameters for an experiment as described herein above.

Population expander 247 may perform such expansion through a number of expansion paths, in which the population definition for the experiments (previously defined by the population selection criteria) may be replaced with a larger population (which is a superset of the previous population definition). Examples may include a variant percentage expansion path which may increase the variant percentage for a given experiment—the percentage of the user population which is assigned to the non-default option B of a given experiment.

For example, an experiment E1 which covers 10% of a given population requires expanding to cover a larger population (e.g. 25%). Population expander 247 may pause the old experiment E1 and starting a new related experiment E2 connected to the E1 using the same underlying parameters and modules except for the population definition.

Thus the 10% of the users which got option B (and not the default option A) based on experiment E1 (the 10%-level experiment) would continue using option B. The remaining 90% of the users for which variant selection has been performed, and which got option A would be handled as follows (through a secondary variant selection process):

Extra 15% (25%-10%) out of 90% would get option B.

The remaining 75% out of 90% would get option A.

Another type of path expansion may involve registered users only. Population expander 247 may split these users into "new users" (registered after the experiment begun) and non-new users. Population expander 247 may allow expansion from new users to all registered users.

Yet another type of path is the anonymous user expansion path. This expansion path may involve anonymous users. Population expander 247 may split the users into "1st time anonymous users" and "repeating anonymous users" (detected according to a cookie installed on their machine). Population expander 247 may allow expansion from "1st time anonymous users" to "all anonymous users".

It will be appreciated that such expansion is subject to the problem of handling users which enter the system from different browsers or machines (and are thus identified as different anonymous users as no cookie can be shared between the multiple sessions).

Population expander 247 may also define additional expansion paths, as long as each population definition in the path is a complete superset of the previous population definition.

Alternatively, the experiment manager might desire to change the population selection criteria in order to test the experiment on a different population which is not a superset of the previous population definition. For example, an experiment was originally opened for Germany and the population selection criterion is modified so the experiment is open for France instead.

Population expander 247 may retain the variant selection (A or B for example) for existing selected users from Germany—thus letting these users which got the B version (for example) to continue using it. However, once "switching to France", new users from Germany will not join the experiment. This may be similar to pausing the experiment for Germany and restarting a new instance of the experiment for France.

Population expander 247 may revert all uses from Germany to the baseline version (the A version) and continue the experiment for French users only. This is similar to terminating the experiment for Germany and restarting a new instance of the experiment for France.

It will be appreciated that data collector 350 may continue to collect data for the experiment. Thus, the statistics for the experiment will combine the results of the pre-change German users with the post-change French users.

Experiment terminator 340 may perform a termination when testing is completed for the particular experiment and it is either discarded or accepted. If accepted, the experiment may be expanded to cover 100% of the population and changes its type from A/B testing to feature toggle (so no further variant selection is performed).

Experiment terminator 340 may also automatically create a developer task in an associated task allocation system, which may call for a developer to merge the experiment code into the baseline code of the system. Once the merging is done, it is reported and experiment terminator 340 automatically removes the feature toggle.

It will be appreciated that experiment terminator 340 may instruct baseline coordinator 360 to merge the terminated experiments into a new baseline (as in more detail herein below). Otherwise the experiment may be retained as a conditional feature toggle (to be activated or de-activated at will).

It will be appreciated that with a website building system environment, not all experiments may be terminated. This typically happens with experiments which add new component types which have been used by users. Thus, the system is "stuck" with sites that include these new (experimental) components. This can be resolved, for example, by editing the affected sites (manually) if the group is small enough.

Alternatively, in situations in which an experiment was used to select between multiple versions of a component, the sites using the "losing" version can be converted (if possible) to a "winning" version of the component. However, all of these methods require the knowledge (and possibly active approval) of the users which used the now-removed component.

Data collector 350 may collect data from the experiments including a history of the experiments, experiment changes, population selection criteria changes etc. It may also collect information such as username, user parameters (whether a user paid or not etc.), BI event type, session parameters (length, was saved, was published, time since last save) etc. This information may be sent to experiment analyzer for analysis as discussed in more detail herein below.

As discussed herein above, experiment analyzer 251 may receive ongoing results via experiment coordinator 300 while the experiments are running.

It will be appreciated that experiment analyzer 251 may evaluate experiments based on the occurrence of measured events which could be simple or complex as described below. The measured events may drive the key performance indicator values which determine the actual benefit of the tested feature to the system provider.

It will be further appreciated that some measured events are events which are naturally collected by experiment analyzer 251 (e.g., a user has registered) and some measured events are not (e.g. the user pressed a new button) but will be collected anyway since they are defined as a measured event. However, once an event has been specified as a measured event, experiment analyzer 251 may collect running totals for it and split these totals according to the A/B or multivariate test groups.

A measured event may be a "negative" event, such "shopping cart abandoned". Such an event is not detected when a specific interaction occurs (e.g. a given button is pressed), but rather when a specific interaction does NOT occur—in this case when a "purchase" button was not pressed (and purchase completed) before the session was ended.

A measured event may require collection of quantitative data (e.g., "total amount purchased") rather than binary data (e.g. was a button pressed or not).

A measured event may not be directly tied to the component affected by the experiment. For example, the experiment may involve modifying the entry screen to the system, whereas the measured event is user registration completion which is performed in a follow-up screen not directly affected by the experiment.

A single experiment may include multiple measured events. For example, the aim of the experiment may be to know how a specific change to the entry screen affects both user registration and user premium subscription upgrade. Data collector 350 may collect the information on both measured events during a single experiment.

Furthermore, a single experiment may also have multiple (two or more) key performance indicators and would be measured (separately) on its effect on these multiple key performance indicators.

It will be appreciated that the results of a single experiment may be different for each key performance indicator measured. For example, a single system change may improve user conversion rate (i.e. upgrades to premium) but have a negative effect on (for example) average session length.

BI server 250 may provide separate reporting for each of the measured key performance indicators. The creator of the experiment may have to decide how to handle cases in which (for example) version A is better for one key performance indicator and version B is better for another key performance indicator. The creator of the experiment may (for example) split the system change into multiple constituent changes, so that each could be measured separately.

A measured event may also include user interface sequences and combinations which may reflect the actual use of the tested feature. For example, in a website building system a new object X was added to a menu Y in a menu hierarchy of possible objects to include in edited websites. Any of the following UI sequences or elements is relevant as a measured event:

The user opened the menu Y containing the new object X (otherwise the user might not be aware of the new object X's existence);

The user inserted the new object X into a website page;

The user inserted another (non-X) object from the menu Y into a website page;

The user insert the new object X and then deleted it or undid the insertion;

The user saved the resulting page containing X (i.e. did not delete/undo the addition);

The user published the resulting page containing X;

System 100 may define a specialized vocabulary which follows the user interface structure, allowing events to be specific using such a vocabulary (e.g. "Insert|component-|gallery+select|picture").

It will be appreciated that the on-going collection of measured events by experiment analyzer 251 for the active experiment may allow for the on-going monitoring of experiment results, so (for example) a decision can be taken on an experiment based on interim results (e.g. if the experiment turns out to be very good or very bad).

It also may allow the anonymization of collected data, so it can be provided to the experiment manager without compromising user privacy. This is particularly important in a multi-tenancy situation in which the experiment manager is (for example) a separate company which provides third party applications.

Experiment analyzer 251 may perform statistical analysis to detect that sufficient data has been collected for a given experiment and that the results have statistical significance—allowing the experiment terminator 340 to stop the experiment at this stage. Such analysis may include not just counting the number of users for which variant selection has been performed, but also measuring the difference in the measured events between the A-variant and the B-variant and detecting statistically significant difference.

It will be appreciated that as time passes, system 100 may discard failing experiments and accept successful experiments which may become a feature toggle open to 100% of the user population. Thus a periodic cleanup stage is performed to integrate the accumulating fully-open feature toggles (created from successful experiments) into the existing baseline using baseline coordinator 360, creating a new baseline also known as the (general availability) version. Baseline coordinator 360 may then deploy this new baseline by replacing the existing baseline.

It will be appreciated that successful experiments are deleted only when the new baseline is successfully deployed so that they are not deployed twice. It will be further appreciated that baseline coordinator 360 may have problems rolling back such a new baseline, since some of the merges might fail and some might not, so that the procedure is complex and sensitive.

The experiment manager can decide to keep some of these feature toggles (instead of merging them with the baseline)—so they would still be conditional in the future, e.g. due to considerations such as resource consumption.

It will be appreciated that failing experiments may be removed completely by experiment integrator 340 at the analysis stage. Alternatively, system 100 may be implemented so that failing experiments are left (as fully-closed experiments) for the cleanup stage—so that their final removal may be done in conjunction with the complete system cleanup.

It will be appreciated that during runtime, system 100 may function with active conflicting experiments, as long as these experiments are separated either manually (by the developer or by the experiments manager) or automatically by active conflict resolver 370.

For example, if experiments E1 and E2 are two conflicting experiments, active conflict resolver 370 may separate them by activating the conflicting experiments for different geographies, e.g. activate E1 for Europe and E2 for the USA—with such a division being manually dictated by the experiments manager during the setup stage.

Active conflict resolver 370 may also divide the relevant user population between the conflicting experiments, e.g. if experiment E1 and E2 should each be tested on 10% of a relevant user population, each would be allocated a separate 10% "block". Such separation is performed at the running stage.

It will be appreciated that the advantage of running conflicting experiments simultaneously but separately, and not resolving the conflict, is that conflict resolution is differed typically until it is determined that both conflicting experiments are successful and need to be expanded to the full user community. If (for example) either one or both of the two conflicting experiments fail (i.e. does not bring about the expected results), the failed experiments are discarded and the conflict is resolved. This may save coordination work, and may make parallel development easier.

It will be appreciated that in some cases, separation is not possible or becomes impossible. For example, two conflicting experiments (e.g. E1, E2) are each run for 25% of the population, and one of them (e.g. E1) is highly successful. The developer may want to expand E1 for use by the entire population immediately—even if the testing of E2 was not finished yet. In such case, the developer would be forced to deal with the conflict between E1 and E2 even though E2 might fail eventually, making the conflict resolution work turn out to be unneeded. In these cases, the trade-off is between the effort required to deal with a conflict (which may be avoidable) and the benefit in expanding the (successful) experiment E1 to the full user population immediately.

Active conflict resolver 370 may maintain the details of conflicts for each open experiment, and update them whenever the experiments change (e.g. a new version of experiment E1 might create a new conflict with experiment E2 but remove an existing conflict with experiment E3). This analysis should also be done whenever the population selection criterion for a given experiment is modified.

Active conflict resolver 370 may also warn the experiment manager whenever any change he performs (e.g. changing a population selection criteria) creates a new conflict.

As discussed herein above, system 100 may also be used to handle experiments which are still being developed, and have not been registered in the experiment server (even for internal/QA purposes). The files comprising such an experiment may reside (for example) on the local developer(s) machine, in an accessible Internet location or as a set of elements inside the website building system.

In such a case, the developer may create a set of relationship definitions (e.g. conflicts and dependencies) and submit them to experiment creator 241 when running the experiment (e.g. use a URL suffice of the forms " . . . &statemap=X&conflict_spec=Y"). The relationship definition cannot be deposited into the experiment server as the underlying experiment has not been deposited.

Active conflict resolver 370 may be capable of resolving such a set of additional experiments and their relationship definitions, which are added to the set of experiments and relationship definitions deposited in the experiment server. This may be done (for example) by using a client-side version of the conflict resolution code from experiment server 240. Alternatively, experiment server 240 may provide a "resolve with additional experiment" web service which would be used by the client code.

It will be appreciated that experiment server code may guarantee that such non-registered experiments are not open to users except for the specific developers—even if they include server-side experiment code.

As discussed herein above, variant selection is typically at the user level, e.g. if the system is a document editing system in nature (such as a word processor or a website building system) the same variant selection is used for all of the user activity following the variant selection for a given experiment.

This is important to maintain variant persistence (and UI experience persistence) across the activity of the user. Thus, a single user editing multiple documents may use the same GUI variant for all editing activity across the multiple edited documents.

However, in some cases variant persistence is not important, and it is more critical to properly apply the population selection criteria according to actual system usage—which is more properly related to number of edited documents (for example) than to number of users. One such case is the presentation of websites to indexing spider by a website building system.

For such cases, experiment selector 310 may base the population selection criteria on document (e.g. edited site) properties rather than user properties. For example—"use alternate rendering engine B instead of the regular A for X % of the sites being indexed in the far-east". This means that the X % may be calculated when counting documents (instead of users) which might be more representative of actual system use.

In the same manner, variant modifier 380 may perform variant selection at any other level and based on the ID of any other persistent object (i.e. edited website, sub-components etc.). The variant selection result may be kept together with object-specific persistent attribute storage.

As discussed herein above, active conflict resolver 370 may achieve conflict resolution during run-time through experiment separation. For example, if conflicting experiments E1 and E2 run for 10% and 20% of the full user population, they would get a 10% block and a 20% block which are disjoint from each other. It will be appreciated that this may be implemented based on an actual random variable and by using a controlling ID (e.g. user ID) provided to the variant determination algorithm as a random variable.

Assuming the random variable V (actual random variable or the controlling ID described above) is a large integer, in this example the active conflict resolver 370 may use:

$((V \bmod 10) \in \{0\})$ for experiment E1 and
$((V \bmod 10) \in \{1,2\})$ for experiment E2.

It will be appreciated the variant modifier 380 may perform separately for each non-conflicting experiment. Active conflict resolver 370 may evaluate conflicting experiment sets together so as to prevent the conflict.

One problem which might be created is experiment interference. For example, if experiments E3 and E4 are two non-conflicting 10% of population experiments and the user ID is used as the controlling ID. In such a case, experiment E3 may be selected for users with $((userID \bmod 10)=0)$, and experiment E4 may also be selected for users with $((userID \bmod 10)=0)$.

Thus, experiments E3 and E4 may always be enabled or disabled together for the same users and the analysis of the experiments results by experiment analyzer 251 may be useless, as the results would reflect a combination of the effects of these two separate experiments, which might have been created by two different developers, unaware of each other.

An example algorithm that may be implemented by active conflict resolver 370 to resolve this is:

Define a minimal variant percentage granularity G—for example 1%.

All experiments should be defined with a variant percentage that is a multiple of G (i.e. a 10 G experiment for 10%, 5 G experiment for 5% etc.).

For each experiment EE with variant percentage of N the system should find a set ES of N distinct random integer values in the range [0 . . . 99] (e.g. $X_1$ to $X_N$).

When checking if the experiment EE should be enabled, and if the controlling random variable is V, test that $((V \bmod (1/G)) \in ES)$.

The integers set ES (as described above) may be determined for the experiment EE upon integration, and would be stored in EE's profile.

Active conflict resolver 370 may perform a similar determination as above to handle conflicting experiments but may select sets ES1 and ES2 with different random integer values in each (for the two conflicting experiments E1 and E2).

As discussed herein above, an experiment may be modified during a single session or between multiple sessions of the same user. The discussion below focuses on client-side changes to the system, though some of it applies to changes that affect the system server.

When starting a session, experiment coordinator 300 may activate (for a given user) the most recent generally available version of the system, Experiment selector 310 may perform variant selection for any new experiment for which no variant selection has been performed for this user and experiment implementer 320 may apply the experiments as specified for the user (except for these which have been terminated/canceled).

It will be appreciated that all of this is subject to override, e.g. by query parameter URL which specifies a value for some experiments or the use of a specific static state map.

It will be further appreciated that system changes may (unavoidably) compromise the goal of user experience persistency. In particular if a specific experiment E has proved to be a failure, it would be removed and when the user returns for a new session he will not see it (even though he saw it before). If a specific experiment E has proved to be a success, it would be added (eventually) to all users, including users in the "A group" who did not see it before.

It will also be appreciated that system 100 may (and typically will) change while the user is in the middle of a session. The user may continue working with the pre-change version and under the currently defined set of experiments.

Experiment implementer 320 may implement the selected set of experiments for a given user (as determined by experiment selector 310) and may provide it to system server 210 for delivery to client 50. In an alternative embodiment this function may be implemented on the client side via client side experiment implementer 56.

The client code used by the user in the session (including any enabled experiments) may not typically change during the session. However, sometimes is desirable to change the client version or set of enabled experiments. For example, a specific experiment E might prove highly problematic with the specific document (e.g. website) being edited by a given user U, but is beneficial with other users. In this case, it is preferable to handle user U as an exception, rather than pausing or terminating the experiment E for all users.

The client version change may be initiated by the user U, or by (for example) company support personnel interacting with the user and initiating a change through a server-based mechanism which notifies the existing client of the need for version change.

One approach is re-starting the session, thus re-loading the client code. Such re-loading may invoke a new experiment configuration, specified through a query-parameter override URL or a cookie injected by the existing client. The existing client may check-point the current session so it can be restarted with the new client version.

A second approach is partial re-loading of affected components. This can be made in systems which support partial component re-loading and dynamic linking. In such a case the client code would necessarily include a loader and linker component to enable re-creating the complete client code after some modified components have been loaded (replacing the previous version).

Such an approach may only be applicable to experiments built with no data initialization or pre-constructed structures.

In the case of switched component, system 100 may include the capability for a server-connected support person to change the relevant flag/value used by the component to determine the selected variant and method of operation.

It will be appreciated that the concept of an experiment management system may serve different purposes as described in more detail herein below.

It will be appreciated that system 100 may provide multi-tenancy support, allowing multiple distinct user classes to use the same experiment management system infrastructure and conduct experiments in parallel. This also applies to users at different user levels as discussed in more detail herein below.

An example is underlying a website building system-type system which supports external component and third party applications. A multi-tenancy version of the system may provide separate access to each third part application provider, allowing him to design and apply tests to his own third party applications without interfering with (or being able to access) tests conducted on the general underlying systems, as well as tests performed by other tenants (such as other third party applications providers). An experiment management system with an underlying website building system-type system may also be opened for web site designers as tenants, so designers using the experiment management system may conduct experiments on their end-users.

As discussed herein above, system 100 may synchronize and manage conflicts between multiple designers working on the same web site, similar to the handling of multiple developers working on the underlying system.

System 100 may support extension to population specification criteria depending on site specific parameters and use patterns. For example, the population specification criteria may limit an experiment to end-users who registered through the specific site registration mechanisms, or to users who placed orders above a certain amount in a site's e-commerce section. System 100 may allow a designer to include hints to the experiments management system as part of the functionality of the site (e.g. defining a site-specific "end user type" value and using it for population specification selection experiment selector 310).

System 100 may also allow site settings, templates or website building system objects to be the subject of an A/B-test. Thus, a single A/B test may change (for example) the background image used by multiple pages in the site and measure the effect on product ordering through the site.

System 100 may also perform BI, conflict checking and related processing separately for each tenant, as each of them is affecting a separate "area". However, experiment interference prevention should still be performed at the system level and include all experiments and all system-level (i.e. not specific site level) tenants, since experiments residing in different system areas might still interfere with each other.

It will be appreciated that the separation between the tenants should also be made by the functionality of experiment manager 244 and the reporting by BI server 250. Each tenant may manage his own experiments, and will receive his own BI reports.

System 100 may provide a top-level view of all activity performed for all tenants which would only be open to the underlying system operation staff.

It will be appreciated that a typical website building system may provide a three level hierarchy of users: a system provider, designers and end-users. However, such a system may also provide a hierarchy with a much larger number of levels.

For example, a system provider may include generic third party application providers (which provide generic third party applications which can be customized), adapted third party application providers (which provide niche-specific customized versions of the generic third party applications, designers which design a blog writing site, blog owning end-users (which create blogs using the blog writing site) and end-users—which write blog posts and talkbacks to the posts in a given blog.

It will be appreciated that in the hierarchy above, some classes of end-users do have read/write permissions and design capabilities, as system 100 may offer end-users (for example) a blog design editing capability which includes a tailored visual design environment.

System 100 may also provide services to users at all levels (except may be the lowest one)—with each user testing "his own users or potential users" down the hierarchy. This is based (in particular) on the system support for experiments which modify code, data and website building system pages.

Thus, for example, experiments created by a third party application provider may apply to all designers, as they are all potential users (clients) of the third party application. On the other hand, experiments created by specific site designers may be limited to end-users who enter the specific web site containing the experiments.

It will also be appreciated that experiments may cross multiple levels. System 100 may allow experiment creators to define conditions and goals at a level which is more than one level below them.

For example, the creator of a blog third party application may want to measure the effects of a given visual change to the "create a talkback" button in his T third party application on the amount and type of created talkbacks. This may also apply to a blogging site creator who is not a third party application provider.

Such an experiment may affect the look and feel of existing web sites which already contain blogs created using the blog third party application. Therefore such a change may occur "under the feet" of the specific web site designer who is already using the third party application, and the web site designer may be unaware of the experiment made by the "higher level" T third party application designer.

Thus, such experiments should be performed very carefully, and system 100 may enforce limits on the visual effects of the change, and may also provide opt-in or opt-out mechanisms for designers who would not like to participate in the experiment. For example, assuming the website building system provides a dashboard for web site designers (or for blog designers in the example above), system 100 may post a message to this dashboard, requesting a confirmation to participate in the experiment.

In the blog example above, the third party application provider would need to know the aggregate results of the experiment (e.g. blog readers who got the B-version of the "post talkback" button posted X % more talkbacks than blog readers who got the A-version). However, specific blog-site owners (and blog owners) may not like the third party application provider to receive membership information or other detailed statistics for any of the blog sites or the specific blog (due to privacy or commercial concerns). Thus, experiment analyzer 251 may provide result aggregation for the experiment manager and limit the amount of details provided.

As discussed herein above, system 100 may allow third party application providers to perform experiments related to the presentation and functionality of the third party application based on the website building system user base through the use of multi-tenancy.

The experiments may involve the third party application's AppStore presentation including: the AppStore Icon, the AppStore Picture; the AppStore marketing material/text; third party application keywords and pricing and packages (i.e. offerings from different third party application sub-versions—each version may or may not have different set of features and offerings and different price);

The experiments may also involve the way the third party applications are presented (to designers) in the website building system, including the third party application's representative icon in the website building system UI (for website building systems which add the third party applications to the existing component menus when the third party application is acquired); the default third party application setup parameters (e.g. frame size and location), the setup dialog of the third party application and the properties dialog of the third party application.

The experiments may also involve any templates or components associated with the third party application and used in the website building system. Third party applications which include associated templates are more fully described in U.S. patent application Ser. No. 14/176,166 titled "Third-party Application Communication API" filed on Feb. 10, 2014 by the joint assignee of this patent application issued as U.S. Pat. No. 10,509,850 on Dec. 17, 2019, and incorporated here by reference.

Experiments may further include run-time behavior of the third party applications such as visual presentation, functionality, popup menus, dialog and other UI elements. This allows the creation of A/B versions of the third party application AppStore, website building system presence or run-time behavior while using the same "slot" (so the two third party application versions are regarded as a single third party application).

The third party application may also use the variant selection information to determine the type of back-end processing to use if the third party application has a server-based component. Such a component may reside on the website building system's provider's servers or on the third party application provider's servers.

Thus system 100 may thus conduct an experiment on behalf of the third party application providers, allowing the third party application provider to use user base segmentation information which is not directly available to him (e.g. specific user profile data fields) without compromising the privacy and business interest of the designers using the third party application.

As discussed herein above, system 100 may be used to support multiple ongoing marketing campaigns. It will be appreciated that in this scenario, the goal is not to optimize an underlying system's features, but rather to optimize the efficiency and ROI (Return on Investment) of the marketing investment.

In this scenario, success metrics (also known key performance indicators) are typically not related to use of features (e.g. which button component design is used more often) but to business goals (e.g. which marketing campaign design brings more users, registrations or premium version purchases).

Figure 7:
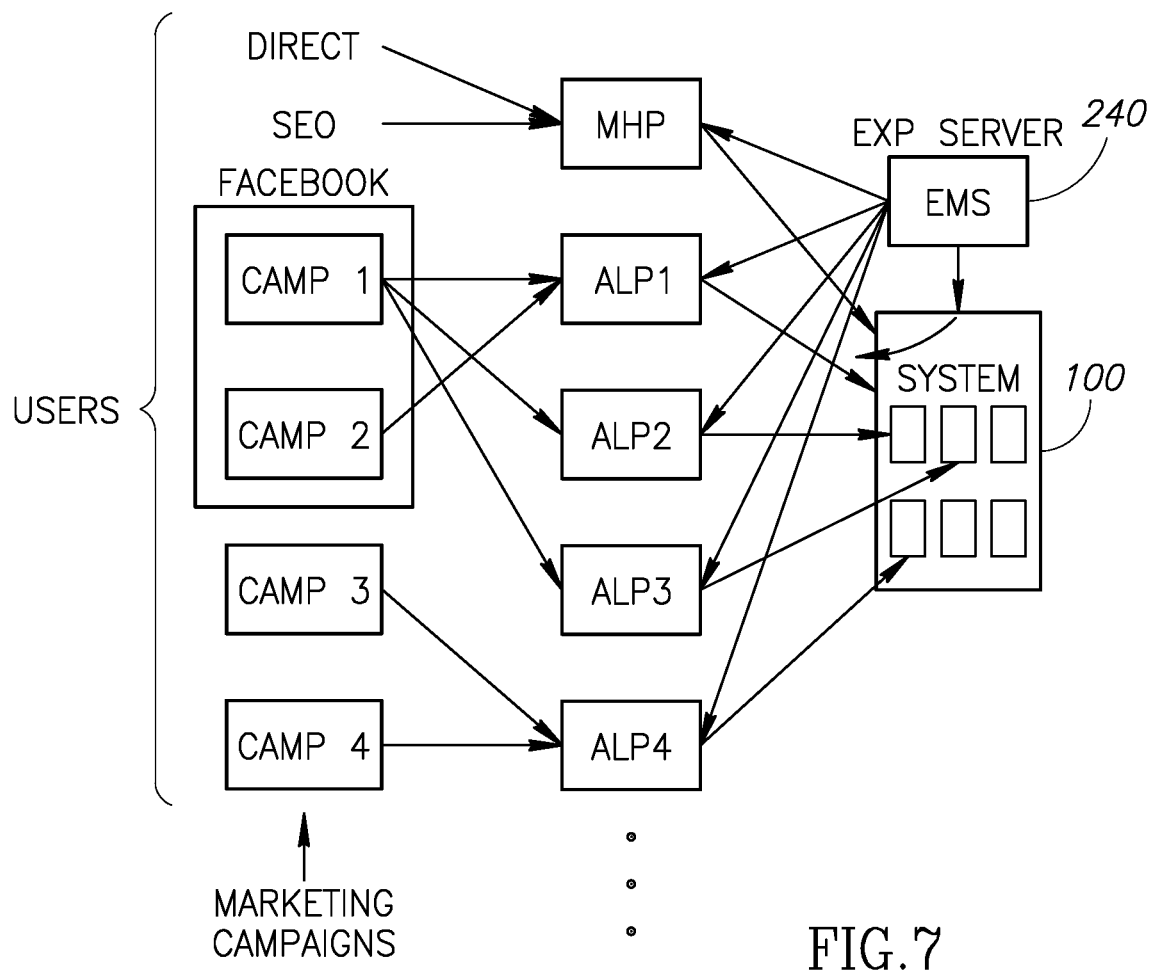
FIG. 7 is a schematic illustration of the interaction between user arrival sources, campaign landing pages and the experiment server of FIG. 2, constructed and operative in accordance with the present invention.

The following discussion described the use of A/B testing and marketing campaigns for the marketing of the underlying system by the system provider. However, the same technology can be applied to "lower level" users. Such users may include third party application providers (marketing their third party applications) and web designers (marketing their web sites). System 100 may be configured to support the marketing effort of these classes of users as well, through multi-tenancy support for multiple user levels as described above, and with the relevant changes applied. This is further illustrated in FIG. 7 to which reference is now made, which demonstrates the interaction between user arrival sources, marketing campaigns, landing pages and experiment server 240.

Users may arrive at the main home page (MHP) which may be the main entry page seen by users entering system 100 by directly accessing system 100 (e.g. typing the URL), through search engines (based on search engine optimization), through traffic which does not include a specific campaign URL (e.g. TV advertising), etc. This last type of traffic is also known as "unfunded traffic", as the system provider does not pay directly for user clicks that reach the system. The other pages of the system may be referred to as internal pages.

System 100 may define one or more alternative landing pages (ALPs) that may be the destination for the marketing campaigns (CAMPs).

The alternative landing pages may be reached through banner ads, social network advertising and other on-line "funded traffic" (i.e. advertising which includes directly clickable links).

These alternative landing pages are alternative versions of the main home page. They typically include a simplified version of the page, but may include the full functionality of the page.

The alternative landing pages may be presented to first time anonymous, returning anonymous or registered users. However, a different version may be displayed to each such type of user, as detected (for example) using a cookie or other persistent storage mechanism (client or server side).

There may multiple versions of each alternative landing page, as determined and generated by system 100.

The system provider may typically deploy multiple campaigns which urge users to use the underlying system. Such marketing campaigns may be (for example) feature oriented ("come and see our new feature X"), generic ("come and try our system") or time-based ("50% discount on subscription price for 3 days").

A marketing campaign may include external elements (e.g. the banner or social network advertisement) as well as internal elements—a specific alternative landing page or a specific system change affected through an experiment (such as a button, text, image, color, item positioning change, registration funnel change, system behavior change etc.). It will be appreciated that a single experiment may include changes to multiple alternative landing pages as well as multiple internal changes.

The alternative landing page may be matched to the campaign, for example, a banner saying "come try feature X" may point to an alternative landing page which may contain a description of the new feature X.

The relationship between marketing campaigns and alternative landing pages is an n:m relationship as (for example) multiple marketing campaigns may point at the same alternative landing page. The alternative landing page can detect which campaign was the originator according to the referrer URL (which may contain a marketing campaign identifier as URL parameter).

A single marketing campaign may point users to one of multiple alternative landing pages in different languages based on the originator locale. Such redirection may be performed inside the MC external banner (e.g. if the MC banner is running as an application inside a social network) or upon entry to the underlying system (selecting one of multiple alternative landing pages on entry). A single marketing campaign may point (through redirect on entry) to different alternative landing pages for registered and unregistered users.

System 100 may implement the changes applied to alternative landing pages as well as internal pages to support any given marketing campaign. System 100 may not include or manage the external banner ads and other external components of the marketing campaign.

System 100 may support defining experiments (and setting the population selection criteria) based on marketing campaign identification—including recognizing various referrer pages and marketing campaign IDs transferred as URL parameters.

System 100 changes to internal pages may include (in particular) changes to the user funnel of the system—user registration and subscription purchase flow.

A marketing manager may define complex marketing campaigns with numerous alternatives as multivariate tests, so as to efficiently manage multiple versions of a single alternate landing page.

It will be appreciated that the analyzed referrer information may also include detailed information about the search keywords used to access the system from a search engine. In such a scenario, system 100 may allow experiments to be based on the specific keywords used. The system may further allow the keywords themselves to be used as a parameter to experiment implementation logic of system 100—so if system 100 was found using the search keywords "X Y Z", these words would be used in some places when prompting to the user.

Such use of an experiment manager server should be carefully evaluated as it tends to break the AB testing framework and BI data collection by introducing additional unstructured element.

It will be appreciated that system 100 may greatly help the staff of the system provider in supporting the system's users (designers and end-users). It will be further appreciated that a system running with a substantial number of open experiments may go through numerous configuration changes every day as experiments are opened, closed or paused. Thus, users may have different configurations from each other (e.g. due to different A/B/multi variant selections) which are also different from the baseline of the system.

Support staff may respond to support issues—either on-line (working with the user as during his session) or off-line (responding to a support issue raised via e-mail or similar mechanism).

Thus, a support person may be required to respond to an issue raised by a user using a specific configuration of the system (possibly even unique to that user)—different from the baseline configuration used internally by the support staff. Furthermore, the issue may appear only when working with this specific configuration and possibly only when working (in a website building system setting for example) on a specific site/document.

To help in recreating the problem, system 100 may use various state map operations (as discussed herein above) including getting the state map (and possibly other session parameters such as user ID, browser, etc.) of a given user and activating the system using a given state map (and possibly applying the other session parameters). In a website building system environment this could refer to starting the editing environment or the run-time environment.

Other state map operations may include modifying a given state map and setting specific experiments to specific variants—which may require affecting other (dependent or conflicting) experiments.

It will be appreciated that system 100 may support a number of modes of operation when modifying a given state for such support-related purposes. One such mode is forced mode in which the given experiment is set to the given variant and dependencies or effects on other experiments are ignored. This may sometimes be impossible to implement. For example, a dependency such as "experiment X strongly depends on experiment Y" (also known as "X must follow Y") may reflect an actual code modification sequence—it is possible that the code modified by experiment X was only inserted by Y, and thus it is technically impossible to apply X without applying Y before it.

Another mode is calculated mode in which the experiment management system conflict resolution sub-system (and conflict resolver 248 in particular) is activated to resolve any dependencies or conflicts created due to the change in the experiment value. Unlike regular experiment management system conflict resolution, the specific experiment(s) modified are regarded as mandatory, i.e. they have priority higher than any other experiment.

Problems may still arise, as the request for state map modification may include (for example) two conflicting experiments. It will be appreciated that unlike a regular experiment management system run, this a secondary run-based on a configuration that has already been resolved. System 100 may instead refer to the original experiment set selected to the user, and attempt to do a new resolution "from scratch" while mandating the specific experiment requests, instead of resolving based on the previously resolved experiment set. System 100 may report the final outcome to the person requesting the modification.

Another mode is interactive calculated mode which may be similar to the calculated mode. However, in this mode, all or some of the conflict cases are referred to the support person requesting the state map change for manual resolution. This is possible since (unlike regular experiment conflict/dependency resolution), resolution does not have to occur automatically and immediately.

Based on the state map-level operations above, system 100 may enable a support person to perform any of the following experiment-related activities:

View current experiment configuration of the users (and other session state variables as noted above). This may include filtering by experiment, developer etc.

Save the state of the users for later inspection—generating a fully-detailed static state map.

Modify a given extracted state map, changing experiment configuration and variant selection, and create a modified state map.

Activate the system (including website building system editing/viewing environments if applicable) using the users' state and possibly his login ID.

Activate the system on users' station using a saved (and possibly modified) state map.

Forward the state of the user to a developer for detailed examination.

Compare saved state maps to detect changes.

Submit saved state maps to the internal bug tracking and development management system of the system provider. This may be done automatically when a new issue is opened in such a system.

It will be appreciated for website building systems, the provider of the system may open a designers' marketplace, allowing experienced designers to offer support services to less experienced designers. Such support services are typically aimed at system use and created site improvement, rather than focusing on issues and problems found in the system.

In such a case, the experienced designer's function as support persons and may thus benefit from the services offered by the system as described herein above. The main function relevant to such supporting of experienced designers is "execute under the same configuration as a given supported user" (for both on-line and off-line support). System 100 may typically limit the access of the experienced designer to detailed experiment information and the capability to make specific state map modifications.

Thus system 100 may coordinate multiple different experiments under a single unified framework with the ability to handle both code and web pages. System 100 may simultaneously set up and run different types of experiments such as A/B tests, multivariate tests, marketing campaigns, feature toggles and system updates allowing for the collection and analysis of the results of the experiments and modifications to the running of the experiments as a result.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.)

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system, said system comprising:
   at least one processor;
   a website building system (WBS) running on said at least one processor to enable website designers to build and host websites, said WBS comprising:
   at least one database storing websites built using said WBS, components of said websites and at least a set of existing experiments to test at least features for said WBS;
   a conflict resolver to detect and resolve conflicts between a first experiment and at least a second experiment from said set of existing experiments, when said first experiment is set-up or integrated into said set of existing experiments, said conflict resolver to either resolve said conflicts, or to allow said conflicts to remain; and
   an experiment manager to manage and coordinate said first experiment and said at least second experiment when said first experiment is running concurrently with said at least second experiment, after set-up or integration of said first experiment into said set of existing experiments by said conflict resolver.

2. The system according to claim 1, said conflict resolver to check for said conflicts within at least one of: a definition and a specification of said first experiment and a definition and specification of said at least second experiment.

3. The system according to claim 1 wherein said conflicts are at least one of: dependency, ambiguity, consistency, and collisions between said first experiment and said at least second experiment.

4. The system according to claim 1 wherein said first experiment is running concurrently with said at least second experiment for at least an experiment developer.

5. The system according to claim 1, said conflict resolver to indicate if said conflicts remain by at least one of: marking conflicting experiments in a database and warning an experiment developer.

6. The system according to claim 1, said conflict resolver to resolve said conflicts using a technique which is least one of: fully automatic, partially automatic and user interactive.

7. The system according to claim 1, said conflict resolver to resolve said conflicts by at least one of: not integrating said first experiment, creating at least one new experiment, changing said first experiment definition, changing said first experiment priority, changing said first experiment source code, changing experiment order, changing user assignment, changing experiment dependency, creating multiple method files, and separating experiments.

8. The system of claim 7 said conflict resolver to indicate when new conflicts are created as a result of a resolution.

9. The system according to claim 1, said experiment manager to manage and coordinate using fully automatic techniques according to a defined set of rules.

10. The system according to claim 1 said experiment manager comprising an active conflict resolver to perform at least one of: changing said first experiment priority, not selecting said first experiment, changing experiment order, changing user assignment, changing experiment dependency, selecting a different experiment, and separating experiments.

11. The system according to claim 10, said experiment manager to perform said selecting a different experiment according to experiment priority.

12. The system according to claim 10 said experiment manager to perform said separating experiments by assigning said experiments to different user populations.

13. The system according to claim 1, said experiment manager to maintain details of said conflicts for said first experiment and to update said details whenever said first experiment changes.

14. The system according to claim 1 wherein said first experiment and said at least second experiment test also test marketing campaigns or system updates for said WBS.

15. A method, said method comprising:
   storing in at least one database, websites built using a website building system (WBS), said WBS to enable website designers to build and host websites, also storing components of said websites and at least a set of existing experiments to test at least features for said WBS;

detecting and resolving conflicts between a first experiment and at least a second experiment from said set of existing experiments when said first experiment is set-up or integrated into said set of experiments, said detecting and resolving to either resolve said conflicts, or to allow said conflicts to remain; and managing and coordinating said first experiment and said at least second experiment when said first experiment is running concurrently with said at least second experiment, after set-up or integration of said first experiment into said set of existing experiments.

16. The method according to claim 15 wherein said checking is performed within at least one of: a definition and a specification of said first experiment and a definition and specification of said at least second experiment.

17. The method according to claim 15 wherein said conflicts are at least one of: dependency, ambiguity, consistency, state maps, and collisions between said first experiment and said at least second experiment.

18. The method according to claim 15 wherein said first experiment is running concurrently with said at least second experiment for at least an experiment developer.

19. The method according to claim 15 and comprising, first indicating if said conflicts remain by at least one of marking said experiment in a database and warning an experiment developer.

20. The method according to claim 18 wherein said resolving comprises operating using a modality which at least one of: fully automatic, partially automatic and via user interactive techniques.

21. The method according to claim 15 wherein said resolving comprises at least one of: not integrating said first experiment, creating at least one new experiment, changing said first experiment definition, changing said first experiment priority, not selecting said first experiment, changing experiment order, changing user assignment, changing experiment dependency, selecting a different experiment, and separating experiments.

22. The method of claim 21 and comprising second indicating if new conflicts are created as a result of said resolving.

23. The method according to claim 15 wherein said managing and coordinating comprises operating automatically according to a defined set of rules.

24. The method according to claim 15 wherein said managing and coordinating comprises at least one of: changing said first experiment priority, not selecting said first experiment, changing experiment order, changing user assignment, changing experiment dependency, selecting a different experiment, and separating experiments.

25. The method according to claim 24 wherein said selecting is according to said experiment priority.

26. The method according to claim 24 wherein said separating comprises assigning said experiments to different user populations.

27. The method according to claim 15, the method comprising maintaining details of said conflicts for said first experiment and updating said details whenever said first experiment changes.

28. The method according to claim 15 wherein said first experiment and said at least second experiment test also test marketing campaigns or system updates for said WBS.

* * * * *